(12) United States Patent
Nam et al.

(10) Patent No.: US 12,193,035 B2
(45) Date of Patent: Jan. 7, 2025

(54) MULTIPLEXING SIDELINK POSITIONING REFERENCE SIGNAL RESOURCES

(71) Applicant: QUALCOMM Incorporated, San Diego, CA (US)

(72) Inventors: Wooseok Nam, San Diego, CA (US); Yucheng Dai, San Diego, CA (US); Tao Luo, San Diego, CA (US); Jing Sun, San Diego, CA (US); Junyi Li, Fairless Hills, PA (US); Peter Gaal, San Diego, CA (US); Sony Akkarakaran, Poway, CA (US); Juan Montojo, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

(21) Appl. No.: 17/481,667

(22) Filed: Sep. 22, 2021

(65) Prior Publication Data
US 2023/0086126 A1  Mar. 23, 2023

(51) Int. Cl.
*H04W 4/00* (2018.01)
*G01S 5/00* (2006.01)
(Continued)

(52) U.S. Cl.
CPC ........... *H04W 72/51* (2023.01); *G01S 5/0072* (2013.01); *H04L 5/0048* (2013.01);
(Continued)

(58) Field of Classification Search
None
See application file for complete search history.

(56) References Cited

U.S. PATENT DOCUMENTS

2016/0330011 A1\* 11/2016 Lee ........................... H04L 5/14
2018/0048444 A1\*  2/2018 Park ..................... H04L 5/0053
(Continued)

FOREIGN PATENT DOCUMENTS

EP          4013171 A1     6/2022
EP          4068810 A1    10/2022
(Continued)

OTHER PUBLICATIONS

International Search Report and Written Opinion—PCT/US2022/075278—ISA/EPO—Dec. 21, 2022.

*Primary Examiner* — Zewdu A Beyen
(74) *Attorney, Agent, or Firm* — QUALCOMM Incorporated

(57) ABSTRACT

Methods, systems, and devices for wireless communication are described. A user equipment (UE) may receive, via first frequency ranges and first time periods, a plurality of sidelink control blocks that each indicate a sidelink positioning reference signal burst pattern for one or more sidelink UEs. The UE may receive, within a second frequency range and during a second time period, a plurality of multiplexed sidelink positioning reference signals from the one or more sidelink UEs in accordance with the sidelink positioning reference signal burst patterns. The UE may determine a position of the UE based at least in part on the receiving of the plurality of multiplexed sidelink positioning reference signals.

29 Claims, 14 Drawing Sheets

(51) Int. Cl.
H04L 5/00 (2006.01)
H04W 72/0446 (2023.01)
H04W 72/0453 (2023.01)
H04W 72/20 (2023.01)
H04W 72/51 (2023.01)

(52) U.S. Cl.
CPC ... H04W 72/0446 (2013.01); H04W 72/0453 (2013.01); H04W 72/20 (2023.01)

(56) References Cited

U.S. PATENT DOCUMENTS

| | | | |
|---|---|---|---|
| 2021/0298088 A1* | 9/2021 | Qi | H04W 74/0833 |
| 2022/0039080 A1* | 2/2022 | Khoryaev | H04W 4/40 |
| 2022/0229146 A1 | 7/2022 | Ko et al. | |
| 2022/0353035 A1 | 11/2022 | Ko et al. | |

FOREIGN PATENT DOCUMENTS

| | | |
|---|---|---|
| WO | WO-2020251318 A1 | 12/2020 |
| WO | WO-2021040494 A1 | 3/2021 |
| WO | WO-2021066592 A1 | 4/2021 |
| WO | WO-2021121058 A1 | 6/2021 |

\* cited by examiner

MULTIPLEXING SIDELINK POSITIONING REFERENCE SIGNAL RESOURCES

FIELD OF TECHNOLOGY

The following relates to wireless communication, including multiplexing sidelink positioning reference signal resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support multiplexing sidelink positioning reference signal (PRS) resources. Generally, the described techniques provide for different options for the relationship between a sidelink control block and its associated PRS burst. The newly defined relationships support multiplexing of multiple PRS bursts and related control blocks. A control block may be in a different slot as its associated PRS burst. If multiple PRS bursts are multiplexed together, the respective control blocks may each be in a separate slot. Alternatively, multiple control blocks may be in the same slot but may occupy different frequency ranges, with each of the control blocks identifying resources for respective PRS bursts that are multiplexed within a single subsequent slot. In order to support multiplexing, the control blocks may occupy a narrow bandwidth, while the PRS bursts may be a wideband burst. Multiple PRS bursts from different user equipment (UE) may occur on different resource elements (REs) within a same slot, thus overlapping in time and frequency range, but still occurring on different REs (e.g., on different tones).

A method for wireless communication at a UE is described. The method may include receiving, via first frequency ranges and first time periods, a set of multiple sidelink control blocks that each indicate a sidelink PRS burst pattern for one or more sidelink UEs, receiving, within a second frequency range and during a second time period, a set of multiple multiplexed sidelink PRSs from the one or more sidelink UEs in accordance with the sidelink PRS burst patterns, and determining a position of the UE based on the receiving of the set of multiple multiplexed sidelink PRSs.

An apparatus for wireless communication at a UE is described. The apparatus may include a processor, memory coupled with the processor, and instructions stored in the memory. The instructions may be executable by the processor to cause the apparatus to receive, via first frequency ranges and first time periods, a set of multiple sidelink control blocks that each indicate a sidelink PRS burst pattern for one or more sidelink UEs, receive, within a second frequency range and during a second time period, a set of multiple multiplexed sidelink PRSs from the one or more sidelink UEs in accordance with the sidelink PRS burst patterns, and determine a position of the UE based on the receiving of the set of multiple multiplexed sidelink PRSs.

Another apparatus for wireless communication at a UE is described. The apparatus may include means for receiving, via first frequency ranges and first time periods, a set of multiple sidelink control blocks that each indicate a sidelink PRS burst pattern for one or more sidelink UEs, means for receiving, within a second frequency range and during a second time period, a set of multiple multiplexed sidelink PRSs from the one or more sidelink UEs in accordance with the sidelink PRS burst patterns, and means for determining a position of the UE based on the receiving of the set of multiple multiplexed sidelink PRSs.

A non-transitory computer-readable medium storing code for wireless communication at a UE is described. The code may include instructions executable by a processor to receive, via first frequency ranges and first time periods, a set of multiple sidelink control blocks that each indicate a sidelink PRS burst pattern for one or more sidelink UEs, receive, within a second frequency range and during a second time period, a set of multiple multiplexed sidelink PRSs from the one or more sidelink UEs in accordance with the sidelink PRS burst patterns, and determine a position of the UE based on the receiving of the set of multiple multiplexed sidelink PRSs.

A method for wireless communication at a UE is described. The method may include receiving, from a sidelink UE, a sidelink control block during a first slot, the sidelink control block indicating a sidelink PRS burst pattern for the sidelink UE, receiving, from the sidelink UE and according to the sidelink PRS burst pattern, a set of multiple multiplexed sidelink PRSs during a second slot that is different from the first slot, and determining a position of the UE based on receiving the set of multiple multiplexed sidelink PRSs.

An apparatus for wireless communication at a UE is described. The apparatus may include a processor, memory coupled with the processor, and instructions stored in the memory. The instructions may be executable by the processor to cause the apparatus to receive, from a sidelink UE, a sidelink control block during a first slot, the sidelink control block indicating a sidelink PRS burst pattern for the sidelink UE, receive, from the sidelink UE and according to the sidelink PRS burst pattern, a set of multiple multiplexed sidelink PRSs during a second slot that is different from the first slot, and determine a position of the UE based on receiving the set of multiple multiplexed sidelink PRSs.

Another apparatus for wireless communication at a UE is described. The apparatus may include means for receiving, from a sidelink UE, a sidelink control block during a first slot, the sidelink control block indicating a sidelink PRS burst pattern for the sidelink UE, means for receiving, from the sidelink UE and according to the sidelink PRS burst pattern, a set of multiple multiplexed sidelink PRSs during a second slot that is different from the first slot, and means for determining a position of the UE based on receiving the set of multiple multiplexed sidelink PRSs.

A non-transitory computer-readable medium storing code for wireless communication at a UE is described. The code may include instructions executable by a processor to receive, from a sidelink UE, a sidelink control block during a first slot, the sidelink control block indicating a sidelink PRS burst pattern for the sidelink UE, receive, from the sidelink UE and according to the sidelink PRS burst pattern, a set of multiple multiplexed sidelink PRSs during a second slot that is different from the first slot, and determine a position of the UE based on receiving the set of multiple multiplexed sidelink PRSs.

DETAILED DESCRIPTION

Some wireless communication systems support the transmission of positioning reference signals (PRSs) to assist a user equipment (UE) in determining its location. While PRSs have traditionally been transmitted by base stations (e.g., via the Uu interface), PRSs could also be transmitted by sidelink UEs (e.g., via the PC5 interface). For example, a sidelink UE may transmit a sidelink control block indicating information pertaining to the sidelink PRS transmissions (e.g., time and/or frequency domain resource allocations). The sidelink UE may subsequently transmit the sidelink PRSs according to the time and/or frequency domain resource allocations. Other UEs may receive the sidelink control block and associated sidelink PRS transmissions and use the sidelink PRS transmissions to determine their respective positions.

Some options relating to the relationship between a sidelink control block and an associated PRS burst have yet to be defined. In addition, methods for multiplexing multiple control blocks and associated PRS bursts so that a UE may receive multiple PRSs during a same time are also desirable.

Generally, the described techniques provide for different options for the relationship between a sidelink control block and its associated PRS burst. The newly defined relationships support multiplexing of multiple PRS bursts and related control blocks. A control block may be in a different slot as its associated PRS burst. If multiple PRS bursts are multiplexed together, the respective control blocks may each be in a separate slot. Alternatively, multiple control blocks may be in the same slot but may occupy different frequency ranges, with each of the control blocks identifying resources for respective PRS bursts that are multiplexed within a single subsequent slot. In order to support multiplexing, the control blocks may occupy a narrow bandwidth, while the PRS bursts may be a wideband burst. Multiple PRS bursts from different UE may occur on different resource elements (REs) within a same slot, thus overlapping in time and frequency range, but still occurring on different REs (e.g., on different tones).

Aspects of the disclosure are initially described in the context of wireless communications systems. Aspects of the disclosure are further illustrated by and described with reference to apparatus diagrams, system diagrams, and flowcharts that relate to multiplexing sidelink PRS resources.

Figure 1:
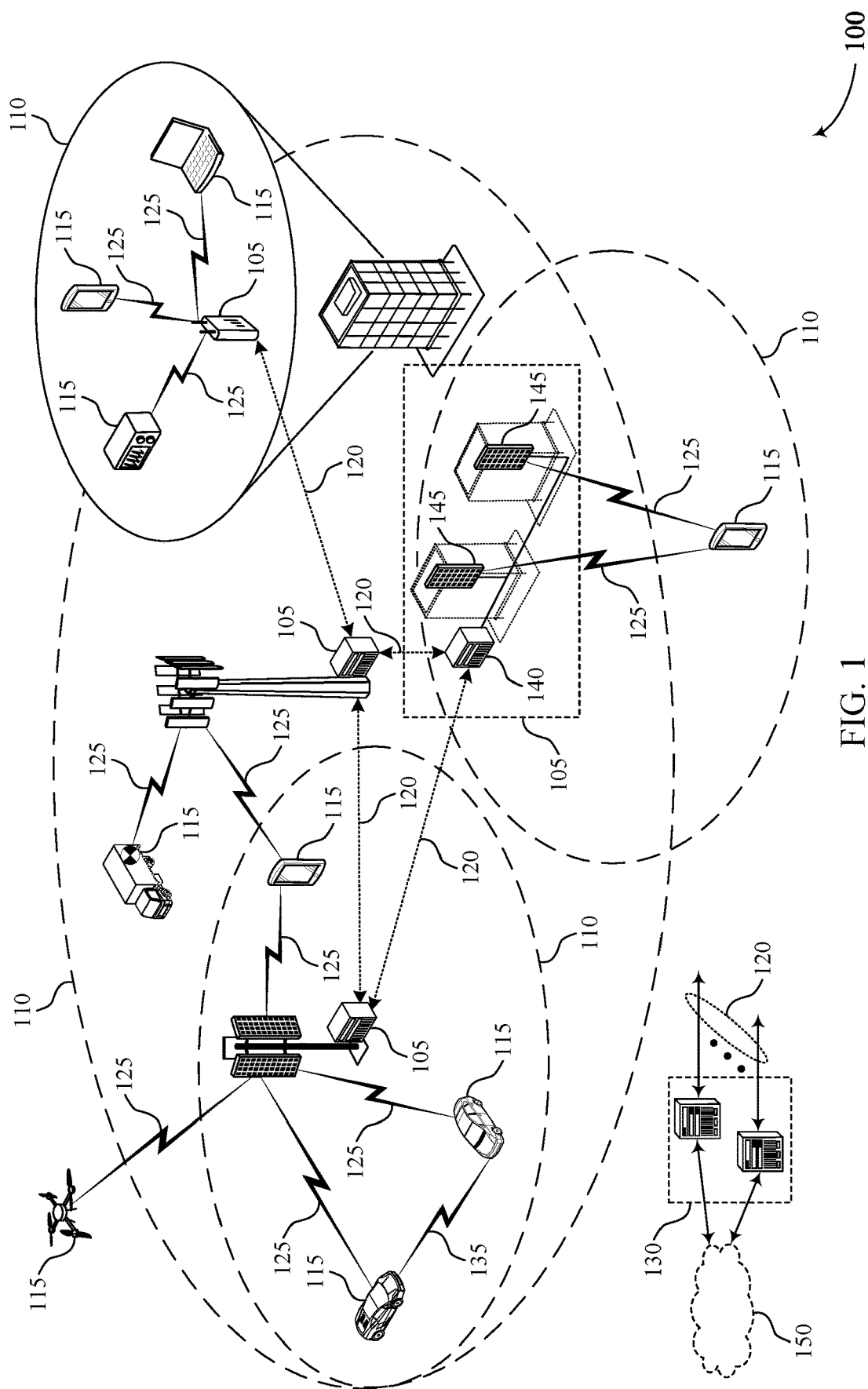
FIG. 1 illustrates an example of a wireless communications system that supports multiplexing sidelink positioning reference signal (PRS) resources in accordance with aspects of the present disclosure.

FIG. 1 illustrates an example of a wireless communications system 100 that supports multiplexing sidelink PRS resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, via first frequency ranges and first time periods, a plurality of sidelink control blocks that each indicate a sidelink PRS burst pattern for one or more sidelink UEs (e.g., other UEs 115). The UE 115 may receive, within a second frequency range and during a second time period, a plurality of multiplexed sidelink PRSs from the one or more sidelink UEs in accordance with the sidelink PRS burst patterns. The UE 115 may determine a position of the UE 115 based at least in part on the receiving of the plurality of multiplexed sidelink PRSs.

A UE 115 may receive, from a sidelink UE (e.g., another UE 115), a sidelink control block during a first slot, the sidelink control block indicating a sidelink PRS burst pattern for the sidelink UE. The UE 115 may receive, from the sidelink UE and according to the sidelink PRS burst pattern, a plurality of multiplexed sidelink PRSs during a second slot that is different from the first slot. The UE 115 may determine a position of the UE 115 based at least in part on receiving the plurality of multiplexed sidelink PRSs.

A UE 115 may receive, from a sidelink UE (e.g., another UE 115), a sidelink control block in a first frequency range, the sidelink control block indicating a sidelink PRS burst pattern for the sidelink UE. The UE 115 may receive, from the sidelink UE and according to the sidelink PRS burst pattern, a plurality of multiplexed sidelink PRSs in a second frequency range that is different from the first frequency range. The UE 115 may determine a position of the UE based at least in part on receiving the plurality of multiplexed sidelink PRSs.

Figure 2:
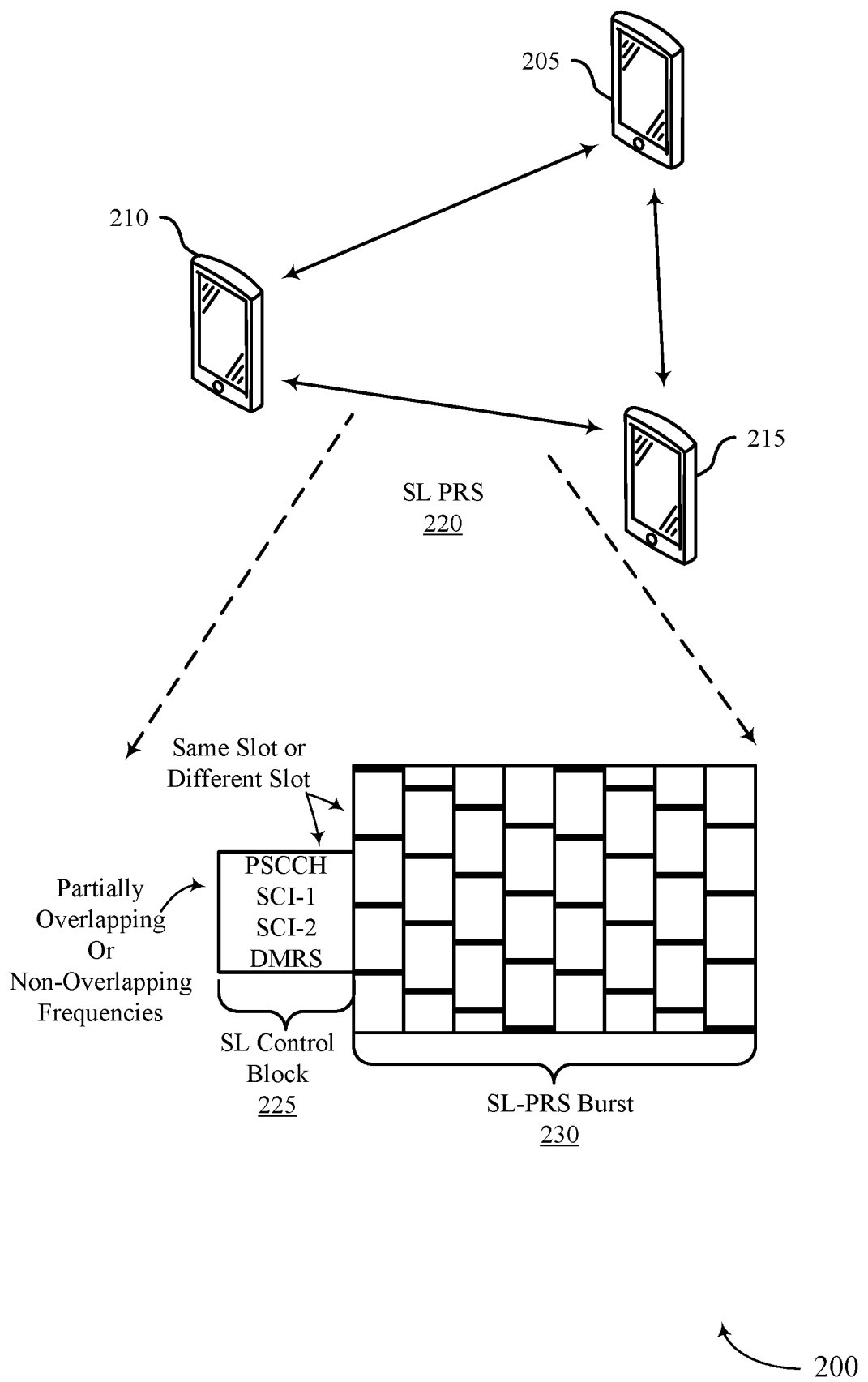
FIG. 2 illustrates an example of a wireless communication system that supports multiplexing sidelink PRS resources in accordance with aspects of the present disclosure.

FIG. 2 illustrates an example of a wireless communication system 200 that supports multiplexing sidelink PRS resources in accordance with aspects of the present disclosure. The wireless communication system 200 may implement or be implemented to realize aspects of the wireless communications system 100. For example, wireless communication system 200 may illustrate communication between a set of UEs (including a UE 205, a UE 210, or a UE 215). In some implementations, the UE 205, the UE 210, and the UE 215 may be examples of UEs 115 as described herein, including with reference to FIG. 1.

Wireless communication system 200 may support procedures and channel structures that devices (any one or more of the UEs) may use to facilitate an acquisition of positioning or ranging information, including one or more aspects of sidelink positioning. For example, a UE (any one or more of the UE 205, the UE 210, or the UE 215) may receive a Uu-PRS via a Uu communications link between the UE 115 and a BS, or may receive an SL-PRS 220 via a sidelink between the UE and another UE (such as a UE 210 that is an example of or functions as a sidelink anchor node), or may receive both a Uu-PRS and an SL-PRS 220. A sidelink anchor node, which may be refer to a UE that transmits an SL-PRS 220, may be any UE 115 associated with suitably accurate position information (for example, that already has accurate knowledge of its position), such as position information obtained from a global navigation satellite system (GNSS) or prior PRS signaling.

The transmission of SL-PRSs 220 may support a higher quantity of PRS transmitters (for example, using more LOS links), or a greater diversity of PRS transmitter locations, which may improve accuracy of UE positioning across various deployment scenarios and in various channel conditions. For example, for a UE with poor channel conditions (such as a UE having relatively few or no LOS Uu links), the transmission of SL-PRSs 220 from a sidelink anchor node may increase a quantity of LOS links over which the UE may receive a PRS (either or both of Uu-PRSs or SL-PRSs 220, where a total quantity of LOS links includes Uu and sidelink LOS links). In some implementations, such as in indoor factory deployments, a lack of or relatively few LOS links may be relatively common. For example, for some indoor factory channels (such as channels used for indoor factory-dense high or -dense low (InF-DH/DL) deployments), devices may have a relatively low probability for LOS links as a result of relative positioning of various devices and the potential for obstruction. For UEs with good channel conditions (such as a UE having a relatively large amount of LOS links), the additional ability to receive SL-PRSs 220 via SL LOS links (e.g., a PC5 interface) may improve overall positioning accuracy by additional measurements (for example, as a result of receiving and measuring more SL-PRSs 220). In some implementations, an increase in Uu or sidelink LOS links may support power efficient P2P positioning or ranging for various uses or deployment scenarios, such as public safety uses.

Additionally, or alternatively, a UE may perform sidelink "sensing" (positioning for a device-free object), which may be performed in a joint framework with sidelink positioning. For example, a UE may perform sensing to detect a device-free object (such as a passive object that may not have a communication capability) using an SL-PRS 220 (as well as a Uu-PRS, where available) as a radar signal. As such, a UE may perform positioning and sensing in a same framework (such as a same signaling framework), where positioning may be related to or otherwise associated with a measurement of one or more LOS components of a PRS, and sensing may be related to or otherwise associated with a measurement of one or more non-LOS (NLOS) components of a PRS. In some implementations, such one or more NLOS components may refer to a reflection from the object.

A UE may communicate with one or more other UEs in accordance with various sidelink communication or resource allocation modes. For example, one or more components of a base station may configure the UEs to communicate in accordance with a sidelink communication resource allocation Mode 1 or a sidelink communication resource allocation Mode 2. In examples in which one or more components of the base station configure the UEs to communicate in accordance with the sidelink communication or resource allocation Mode 1, one or more components of the base station may schedule sidelink communication between the UEs may allocate resources for the UEs to perform the scheduled communication. In examples in which one or more components of the base station configure the UEs to communicate in accordance with the sidelink communication or resource allocation Mode 2, one or more components of the base station may allocate a set of resources (such as a resource pool) for the UEs and the UEs may autonomously schedule sidelink communication using resources from the set of resources (for example, without receiving scheduling information from one or more components of the base station).

In some deployment scenarios (such as in deployment scenarios in which one or more of the UEs are OoC of one or more components of a base station and in which one or more components of the base station configures the UEs for sidelink communication or resource allocation Mode 2), communication between the UEs may rely on distributed coordination among the UEs (for example, the sidelink nodes). For example, the UEs may share a common resource pool for sidelink (SL) communication and each UE may identify or select candidate resources within the common resource pool by channel sensing and exclusion. For example, a UE may select a resource for communication among the candidate resources and may transmit, to one or more other UEs, reservation information indicating that the UE has reserved the selected resource. The one or more other UEs may receive the reservation information, identify the reserved resource, and exclude the resource from its own resource selection accordingly.

For sidelink communication in accordance with the sidelink communication or resource allocation Mode 2 (according to which one or more components of a base station refrain from providing scheduling information or controlling communication between the UEs), reference signal transmissions may be aperiodic. In other words, due to the distributed nature of a Mode 2 resource allocation, a UE may transmit a reference signal as a result of or responsive to receiving a request for the reference signal. For example, a UE may receive a message (such as a CSI-request field in SCI-2) triggering a sidelink CSI-RS measurement report. In such examples in which the UE (a designated receiver) receives a CSI-request field in SCI, the UE may receive a CSI-RS along with (such as multiplexed with) data, measure the CSI-RS, and transmit a sidelink CSI-RS measurement report responsive to receiving the CSI-request field and using the CSI-RS measurement. Similarly, a UE may transmit a PRS (an SL-PRS 220) as a result of receiving a request for the PRS from another UE. Such a request-based procedure for transmission of SL-PRSs 220 may result in SL-PRSs 220 being sent aperiodically or semi-persistently transmitted. For example, wireless communication system 200 may support on-demand SL-PRS 220 such that a UE may transmit an SL-PRS request to one or more other UEs or one or more other devices, such as roadside units (RSUs). A UE transmitting the SL-PRS request may transmit a request via SCI (such as one or both of SCI-1 or SCI-2) or via a MAC-CE. A UE transmitting an SL-PRS request may transmit the request via unicast signaling, broadcast signaling, or multicast signaling. Responsive to receiving an SL-PRS request, a UE may transmit an SL-PRS 220 with a staggered comb pattern during a portion of a TTI (such as a slot) and, in some implementations, the TTI may be associated with a slot format that is dedicated for SL-PRS transmissions.

In some implementations, a UE (any of UE 205, UE 210, and/or UE 215, which may be examples of or function as a sidelink anchor node) may transmit an SL-PRS 220 following sensing and resource selection procedures, which may implement one or more aspects of such techniques for transmitting other sidelink resource allocation Mode 2 transmissions. To reserve resources for the SL-PRS 220, the UE may perform one or more of various resource reservation or pre-emption techniques to obtain sufficient resources for the transmission of the SL-PRS 220. For example, a positioning resolution may be associated with (such as correlated with) a sub-channel allocation for an SL-PRS slot during which the UE transmits the SL-PRS 330, where a greater bandwidth for the SL-PRS 220 may provide higher resolution positioning or ranging information and, accordingly, a full bandwidth of the allocated resource pool may provide receiving UEs with an upper limit or highest resolution.

In some implementations, to reserve a relatively large sub-channel allocation for the SL-PRS slot, UEs may support a priority ranking for different types of sidelink transmissions, and an SL-PRS slot (or the SL-PRS 220) may have a relatively high priority that supports an SL-PRS slot preempting other transmissions in the same slot. As such, the UE may transmit the SL-PRS 220 using the SL-PRS slot and over the full bandwidth of the resource pool (as other transmissions that overlap in time with the SL-PRS slot may be pre-empted by the SL-PRS 220). Additionally, or alternatively, SCI (such as a first SCI-1) associated with (such as scheduling) an SL-PRS transmission may reserve resources for the SL-PRS 220 in any one or more of a current slot (the slot during which the UE transmits the reserving SCI-1) or one or more future slots. In such implementations in which the UE reserves resources for the SL-PRS 220 via SCI (such as SCI-1), the UE may reserve resources in the current slot or in the one or more future slots in a same sub-channel, in different sub-channels, or in another resource pool (such as another resource pool that is frequency division multiplexed with the resource pool allocated for the UE). In other words, the SCI may assign resources for SL-PRS transmissions in a same sub-channel, in different sub-channels, or in another frequency division multiplexed resource pool. In implementations in which the UE performs SL-PRS transmissions in different sub-channels or in another resource pool, the UE may perform the SL-PRS transmissions such that phase continuity is maintained across the transmissions. Further, a receiving UE that receives SL-PRS transmissions over different sub-channels or in other frequency division multiplexed resource pools may combine (for example, stitch together) the multiple SL-PRS transmissions into a wideband SL-PRS 220 (and thus may achieve a higher resolution).

In some implementations, the UE may perform the SL-PRS transmissions over a same slot (such that the SL-PRS slots are simultaneous) or within a configured duration (for example, a relatively short duration) and may transmit the SL-PRS 220 in different sub-channels or over multiple frequency division multiplexed resource pools. The UE, if performing SL-PRS transmissions across multiple frequency division multiplexed resource pools, may perform the SL-PRS transmissions such that there is phase coherence across the multiple frequency division multiplexed transmissions. Additionally, or alternatively, the UE may use resources at the edge of the allocated resource pool to transmit the SL-PRS 220. For example, there may be residual (unoccupied) resources at the edge of the resource pool and the UE may, in addition or as an alternative to using other resources, may use such residual resources for SL-PRS transmissions. Further, although described in the context of aperiodic SL-PRS transmissions, the UE may alternatively perform SL-PRS transmissions periodically or semi-persistently and may use a periodic resource reservation to reserve resources for such periodic or semi-persistent SL-PRS transmissions.

Additionally, or alternatively, the may use resources that are dedicated for SL-PRS transmissions. Such dedicated resources may include a resource pool, a set of sub-channels, or a set of slots, or any combination thereof, and the UE may receive an indication (such as a configuration) of the dedicated resources from one or more components of a base station, or the UE may be pre-configured with the dedicated resources (such that the dedicated resources are pre-loaded at the UE and, in some implementations, defined by a specification). In some implementations in which the UE uses resources for SL-PRS transmissions from the resources that are dedicated for SL-PRS transmissions, the UE may transmit one or more SL-PRSs 220 without sensing or reservation. Additionally, or alternatively, a UE may receive a configuration of a measurement gap and may transmit or receive SL-PRSs during the measurement gap. Such a measurement gap may include or otherwise refer to a time duration (for example, a configured duration, a configured periodic interval) during which the UE expects to transmit or receive SL-PRSs and during which the UE does not expect to transmit or receive other sidelink channels, such as a PSSCH.

The UE may transmit the SL-PRS 220 via different cast types for different uses. For example, the UE may transmit the SL-PRS 220 via unicast signaling (for P2P ranging) or may transmit the SL-PRS 220 via multicast signaling or broadcast signaling (for group positioning or sensing). In some implementations, the UE may transmit the SL-PRS 220 via a dedicated cast type that is exclusively used for SL-PRS transmissions. Such a dedicated cast type may be referred to as 'positioning broadcast' and, accordingly, the UE may transmit the SL-PRS 220 via positioning broadcast signaling.

In some aspects, the described techniques may enhance the SL-PRS 220 design to efficiently support wideband SL-PRS, as well as multiplexing of multiple SL-PRS 220 in the same slot. A wideband SL-PRS 220 may provide higher positioning/sensing resolutions. Multiplexing of SL-PRS resources (e.g., transmitted by different anchor nodes) within the same time and frequency may be used (e.g., to avoid excessive resource overhead of the wideband SL-PRS).

For example, the SL-PRS slot may include a control block (e.g., a sidelink control block 225) and the SL-PRS burst 230. The sidelink control block 225 may include a PSCCH (e.g., which may carry SCI-1, among other information), SCI-2, and one or more DMRS. The UE receiving the SL-PRS 220 may monitor for the sidelink control block 225 following legacy procedures (e.g., blind decoding candidate sub-channels for PSCCH). SCI-1 and/or SCI-2 in the sidelink control block 225 may carry or otherwise convey information for an associated SL-PRS burst 230 (e.g., the time domain resource allocation (TDRA), frequency domain resource allocation (FDRA), a pattern for the SL-PRS burst 230, transmit power level, etc.). The pattern for the associated SL-PRS burst 230 may have a staggered comb pattern, although other patterns may be adopted or otherwise implemented.

Generally, placement of the sidelink control block 225 and SL-PRS burst 230 may take various approaches. As discussed above, in some examples the sidelink control block 225 and associated SL-PRS burst 230 may be in the same slot or in different slots (e.g., future slots). The sidelink control block 225 and associated SL-PRS burst 230 may have a different bandwidth and, in some examples, may not overlap in the frequency domain. For example, the bandwidth of the sidelink control block 225 may be fixed (e.g., one sub-channel) and/or (pre)configured. The FDRA (e.g., the starting sub-channel and the number of allocated sub-channel(s)) may be indicated in SCI-1 and/or SCI-2 in the sidelink control block 225. In some examples, the sidelink control block 225 may carry or otherwise convey an indication that the slot (e.g., the offset between the sidelink control block 225 and SL-PRS burst 230) and bandwidth of the SL-PRS burst 230 (e.g., the TDRA, FDRA, etc., for the SL-PRS burst 230).

Accordingly, in some examples the UE (e.g., any of UE 205, UE 210, and/or UE 215, which may be examples of anchor nodes within the sidelink network) may receive the sidelink control block 225 during a first slot, with the sidelink control block 225 indicating the SL-PRS burst 230 pattern (e.g., the TDRA, FDRA, etc., for the plurality of SL-PRS transmissions). The UE may receive the plurality of multiplexed SL-PRS (e.g., the SL-PRS burst 230) during a second slot that is different from the first slot (e.g., the SL-PRS burst 230 is received in a later slot than the sidelink control block 225). In another example, the UE may receive the sidelink control block 225 in a first frequency range (e.g., bandwidth, sub-channel(s), etc.) and then receive the plurality of multiplexed SL-PRS (e.g., the SL-PRS burst 230) in a second frequency range (e.g., bandwidth, sub-channel(s), etc.) that is different from the first frequency range. In some examples, the sidelink control block 225 may be received in a frequency range that is a subset of the frequency range of the SL-PRS burst 230 (as shown in FIG. 2) or may be in a non-overlapping frequency range (e.g., in different sub-channels, using different resource pools, etc.). The UE may receive the sidelink control block 225 and SL-PRS burst 230 in the same or different slots and/or in the same or different frequency ranges from other sidelink UE(s) (e.g., other sidelink anchor nodes) and use the SL-PRS transmissions to identify or otherwise determine their own position and/or positioning information for an object (e.g., an object without communication capabilities, such as a building, vehicle, person, sign, etc.) based on the SL-PRS burst 230.

In some examples, multiple SL-PRS burst 230 from different sidelink anchor nodes may be multiplexed in the same slot. That is, the SL-PRS bursts 230 of different anchor nodes may be interlaced in different sets of tones in the frequency domain. The different SL-PRS bursts 230 may have different tone offsets and/or occupy different sets of tones. The tone offset may be (pre)configured and/or indicated in the sidelink control block 225. The tone offset may dynamically change over time (e.g., to reduce interference, such as adjacent channel leakage, near-far effect, etc.). The sidelink control blocks 225 of different UE (e.g., sidelink anchor nodes) may be FDM'd in different sub-channels in the same slot and/or TDM'd in different slots.

Accordingly, a UE (e.g., any of UE 205, UE 210, and/or UE 215, one or more of which may be examples of sidelink anchor nodes) may receive a plurality of sidelink control blocks 225 from other sidelink UEs. Each sidelink control block 225 may carry or otherwise convey an indication (implicitly and/or explicitly) the SL-PRS burst 230 pattern for the associated sidelink UE. For example, each sidelink UE may transmit their own sidelink control block 225 indicating the TDRA, FDRA, etc., for their own transmission of SL-PRS burst 230. The UE may receive the sidelink control blocks 225 from the other sidelink UE(s) in a first frequency range and during first time periods.

The UE may then receive a plurality of the SL-PRS burst 230 from the other sidelink UE(s) according to the associated sidelink control block 225. The plurality of multiplexed (e.g., in the time and/or frequency domain) SL-PRS burst 230 may be received in a second frequency range and during a second time period.

As discussed above, the sidelink control blocks 225 from other sidelink UE(s) may be received in the same slot as the corresponding SL-PRS burst 230, in some examples. For example, the UE may receive the plurality of sidelink control blocks 225 during a first subset of symbols (e.g., the first few symbols) of the slot and receive the corresponding SL-PRS burst 230 in a second subset of symbols of the slot (e.g., later symbols within the slot). The first time period in this example may correspond to the first subset of symbols and the second time period in this example may correspond to the second subset of symbols.

As also discussed above, the sidelink control blocks 225 from other sidelink UE(s) may be received in different slots as the corresponding SL-PRS burst 230, in some examples. For example, the UE may receive the sidelink control block 225 in a first slot and then receive the corresponding SL-PRS burst 230 in a second slot (e.g., a subsequent slot). In some examples, the UE may receive a plurality of sidelink control blocks 225 from other sidelink UEs in different first slots (e.g., the sidelink control blocks 225 scheduling SL-PRS burst in the second slot may be received in different first slots from the other sidelink UEs). The first time period in this example may correspond to the one or multiple different first slots and the second time period in this example may correspond to the second slot.

As also discussed above, the sidelink control blocks 225 from other sidelink UE(s) may be received in overlapping frequency ranges. For example, the UE may receive the sidelink control block 225 in a first frequency range that overlaps with the second frequency range. For example and as is shown by way of example only in FIG. 2, the sidelink control block 225 may be received in a frequency range (e.g., bandwidth, sub-channel(s), etc.) that is a subset of the second frequency range of the SL-PRS burst 230. In some examples, different sidelink control blocks 225 from other sidelink UEs may be received in different first slots (e.g., in different slots), with each sidelink control block 225 scheduling a SL-PRS burst 225 in the second slot. In other examples, the sidelink control blocks 225 may be received in a first frequency range that is a non-overlapping frequency range (e.g., in non-overlapping sub-channel(s), non-overlapping bandwidths, different sidelink resource pools, etc.) with the second frequency range that the SL-PRS burst 230 are received in.

Accordingly, the UE may receive the plurality of multiplexed SL-PRS (e.g., the SL-PRS bursts 230) from the other sidelink UE(s) that are multiplexed on different tones within the second frequency range and during the second time periods according to the SL-PRS burst 230 pattern (e.g., according to the TDRA, FDRA, etc., indicated in the sidelink control blocks 225 for the corresponding SL-PRS burst 230). The UE may use the SL-PRS burst 230 received from other sidelink UE(s) to identify or otherwise determine positioning information for the UE and/or positioning information for nearby object(s).

Figure 3:
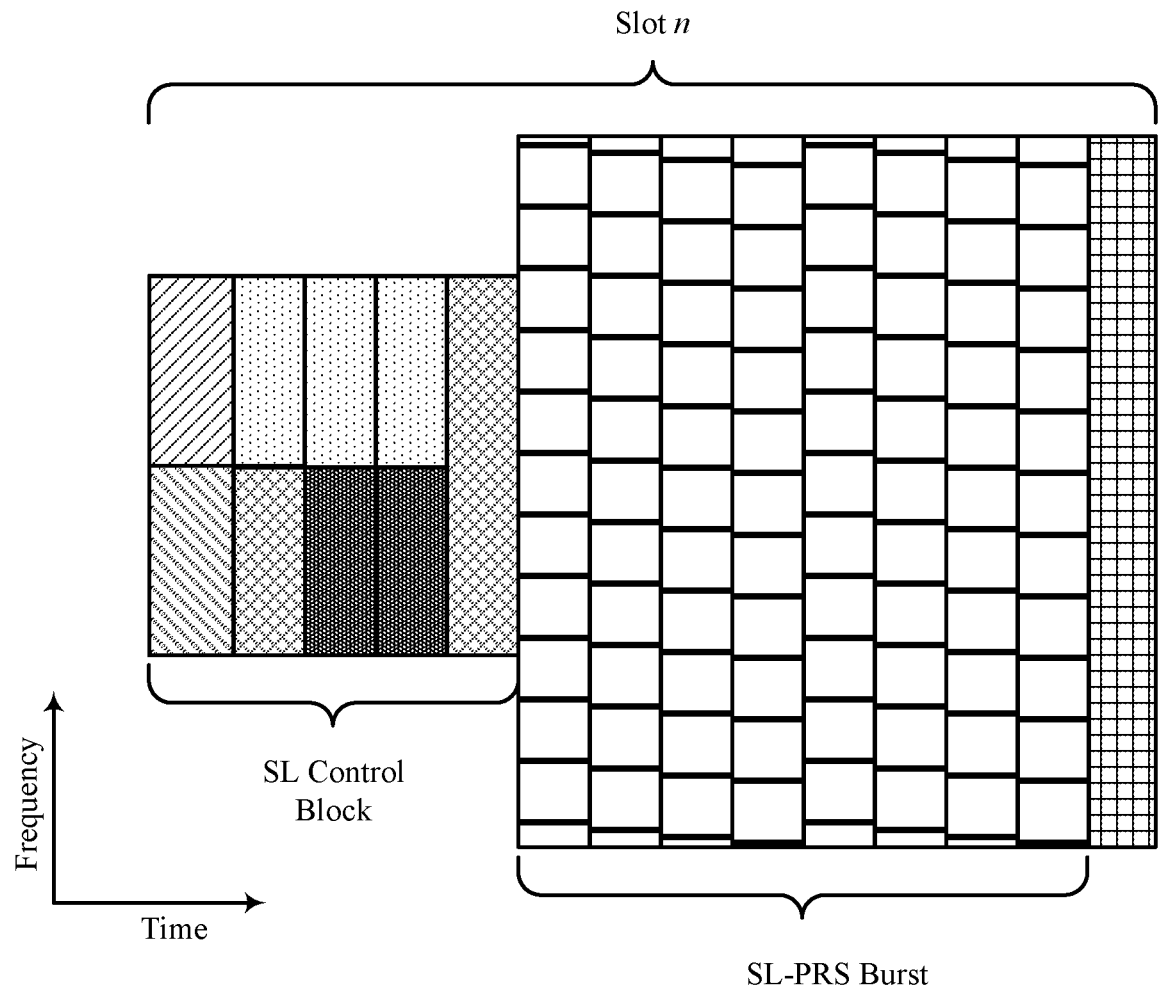
FIG. 3 illustrates an example of a PRS configuration that supports multiplexing sidelink PRS resources in accordance with aspects of the present disclosure.

FIG. 3 illustrates an example of a PRS configuration 300 that supports multiplexing sidelink PRS resources in accordance with aspects of the present disclosure. PRS configuration 300 may implement or be implemented to realize aspects of the wireless communications systems 100 and/or 200. Aspects of PRS configuration 300 may implemented at or implemented by a UE, which may be an example of the corresponding device described herein. The PRS configuration 300 illustrates an example of a 12-symbol pattern, however the techniques described herein may be implemented using a different symbol pattern duration (e.g., such as a 9-symbol pattern).

As discussed above, some examples of the described techniques support a sidelink control block being in a different frequency range than the associated SL-PRS burst. For example, a UE may receive a sidelink control block from another sidelink UE (e.g., a sidelink anchor node). The sidelink control block may be received in a first frequency range (with frequency being generally represented along the horizontal axis in FIG. 3). The sidelink control block may carry or otherwise convey (implicitly and/or explicitly) an indication of an associated SL-PRS burst pattern (e.g., the TDRA, FDRA, etc., for the SL-PRS burst). The UE may receive the SL-PRS burst (e.g., a plurality of multiplexed SL-PRSs) in a second frequency range that is different from the first frequency range that the sidelink control block is received in. For example, the first frequency range that the sidelink control block is received in may be a subset frequency range (e.g., a subset of sub-channels, tones, etc., within the second frequency range). This example is illustrated in FIG. 2 where the sidelink control block is in a smaller, but overlapping, frequency range within the second frequency range of the SL-PRS burst. In another example, the first frequency range that the sidelink control bloc is received in may be in a non-overlapping frequency range with respect to the second frequency range that the SL-PRS burst is received in. For example, the first frequency range may be in different sub-channels, in different carriers, may use different resource pools, and the like, than the second frequency range.

In some implementations, the slot format (e.g., the slot n format) may be for (such as available for) sidelink communications in addition to other slot formats, but the slot format may be dedicated for SL-PRS transmissions in some examples. The slot format may include a first symbol portion 305 and a first symbol portion 310, one or more DMRSs 315, a PSCCH 320 (carrying SCI-1), SCI-2 325, a SL-PRS burst including the SL-PRS 330, and one or more gap symbols 335. In some implementations, a first symbol portion 305 may be a repetition of a PSCCH 320, and a first symbol portion 310 may be a repetition of a DMRS 315 (for example, in a slot format associated with 14 total symbol duration). As shown in FIG. 3, the slot format may include an SL-PRS burst spanning eight symbols, although a slot format with an SL-PRS burst spanning four symbols may be adopted in some examples. In some implementations, the slot format may lack or be absent of a PSSCH (an SL-SCH). For example, instead of including a PSSCH portion, the slot format may include a portion dedicated for an SL-PRS burst.

The SL-PRS 330, which a UE (e.g., a sidelink anchor node) may transmit during an SL-PRS burst (a set of consecutive symbols), may feature or otherwise be associated with a transmission pattern, such as a staggered comb pattern, where the SL-PRS 330 may be distributed on different subsets of frequency resources in successive symbol durations. In some implementations, the SL-PRS 330 may feature or be associated with a similar structure or pattern as a Uu-PRS. In some implementations, one or both of a candidate slot and the SL-PRS pattern may be configured (for example, pre-configured) at a UE transmitting an SL-PRS 330, or a UE receiving an SL-PRS 330 may receive control signaling (such as SCI-2) indicating one or both of the candidate slot and the SL-PRS burst pattern.

In some implementations, a UE may use a different transmit power or different timing for SL-PRS slots (slots transmitted in accordance with the slot format) as compared to other sidelink transmissions. For example, a UE may use a different transmit power for signaling sent during an SL-PRS slot or an SL-PRS slot may span a different amount of time (such as a different quantity of symbols) than other slots, such as slots including a PSSCH portion. In some examples in which the UE uses a different transmit power for signaling sent during a SL-PRS slot, the UE may use a different transmit power control procedure (such as a transmit power control procedure that is dedicated for SL-PRS slots) than another transmit power control procedure used for other signaling (such as for a sidelink slot including a PSSCH). In other words, the UE may use a first transmit power control procedure that is associated with a first target receive power and a first pathloss compensation factor for SL-PRS slots and the UE may use a second transmit power control procedure that is associated with a second target receive power and a second pathloss compensation factor for slots including a PSSCH. In some examples in which the UE uses different timing for SL-PRS slots than for slots including a PSSCH, the UE may use different timing synchronization (associated with a synchronization source) for the different types of slots. For example, for a PSSCH transmission, the UE may use a transmission timing that is relative to timing obtained from a network entity or another sidelink node (via a synchronization signal, such as an SSB), but, for an SL-PRS transmission, the UE may use a transmission timing that is relative to an absolute time obtained from a GNSS.

Additionally, or alternatively, the UE may transmit the SL-PRS 330 using a different transmit power or different timing than other signaling sent within that SL-PRS slot. For example, a UE may transmit the SL-PRS 330 using a different transmit power or different timing (for example, may define symbol durations differently for an SL-PRS burst than other symbols within the SL-PRS slot) than the UE uses for the first symbol portion 305, the first symbol portion 310, the one or more DMRSs 315, the PSCCH 320, the SCI-2 325, or any combination thereof. In such examples, the UE may use a slot format (such as the slot n format) that provides one or more gap symbols 335 during which the UE may adjust one or both of a transmit power or a transmit timing. For example, the slot format may include a gap symbol 335 before an SL-PRS burst and a gap symbol 335 after the SL-PRS burst and the UE may adjust a transmit power of the UE during those gap symbols 335. The one or more gap symbols 335 may also be used for retuning operations where the UE transitions between transmit and receive operations, or vice versa.

Figure 4:
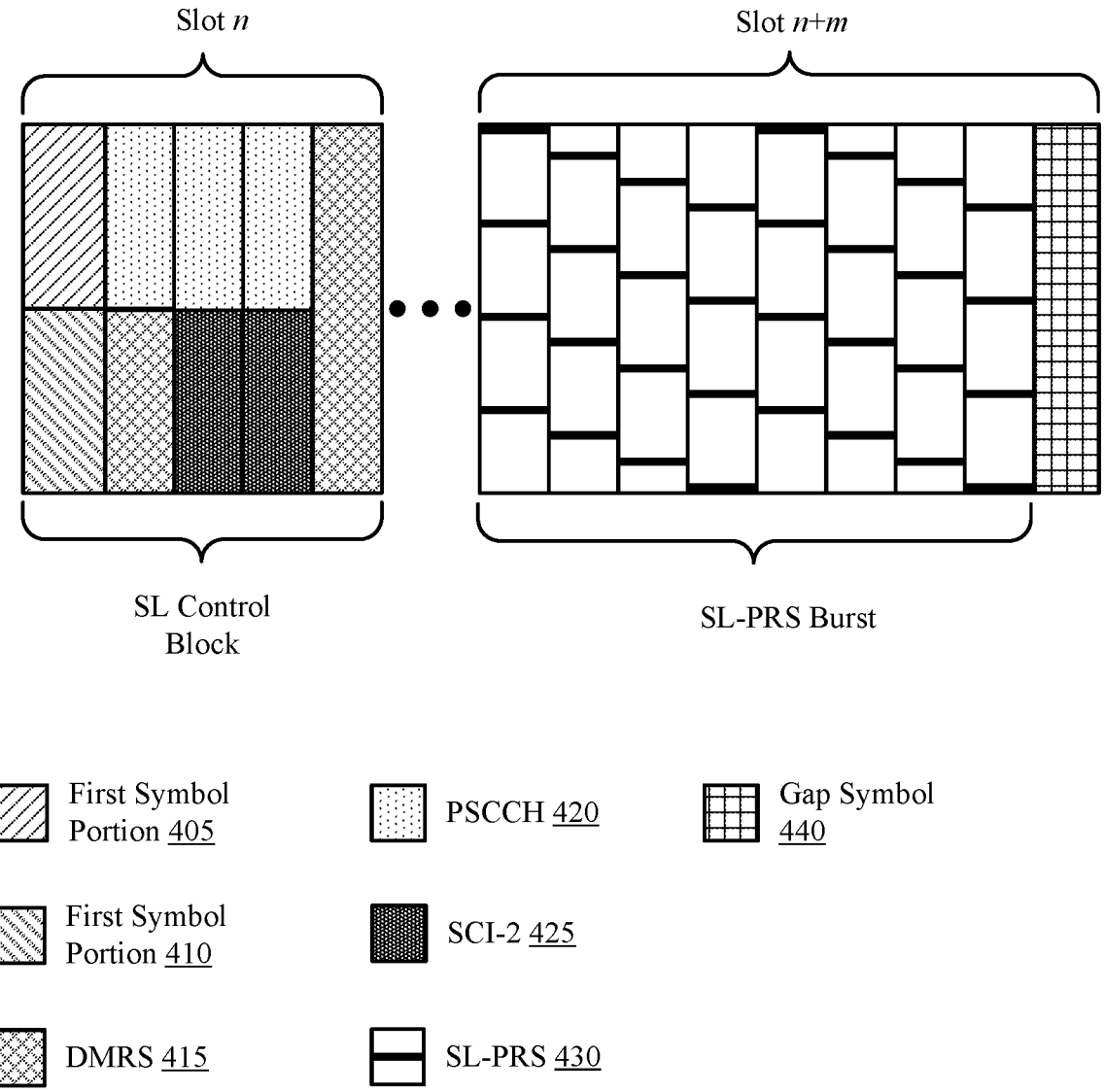
FIG. 4 illustrates an example of a PRS configuration that supports multiplexing sidelink PRS resources in accordance with aspects of the present disclosure.

FIG. 4 illustrates an example of a PRS configuration 400 that supports multiplexing sidelink PRS resources in accordance with aspects of the present disclosure. PRS configuration 400 may implement or be implemented to realize aspects of the wireless communications systems 100 and/or 200 and/or PRS configuration 300. Aspects of PRS configuration 400 may implemented at or implemented by a UE, which may be an example of the corresponding device described herein. The PRS configuration 400 illustrates an example of a 12-symbol pattern, however the techniques described herein may be implemented using a different symbol pattern duration (e.g., such as a 9-symbol pattern).

As discussed above, some examples of the described techniques support a sidelink control block being in a different slot than the associated SL-PRS burst. For example, a UE may receive a sidelink control block from another sidelink UE (e.g., a sidelink anchor node). The sidelink control block may be received in a first slot (such as during slot n, with time being generally represented along the horizontal axis in FIG. 4). The sidelink control block may carry or otherwise convey (implicitly and/or explicitly) an indication of an associated SL-PRS burst pattern (e.g., the TDRA, FDRA, etc., for the SL-PRS burst). The UE may receive the SL-PRS burst (e.g., a plurality of multiplexed SL-PRSs) in a second slot (e.g., during slot n+m) that is different from the first slot that the sidelink control block is received in. For example, the second slot that the SL-PRS burst is received in may be a subsequent slot (e.g., a future slot) than the first slot that the sidelink control block is received in.

In some implementations, the slot format (e.g., the slot n and/or slot n+m) may be for (such as available for) sidelink communications in addition to other slot formats, but the slot format may be dedicated for SL-PRS transmissions in some examples. The slot format (e.g., the sidelink control block may include a first symbol portion 405 and a first symbol portion 410, one or more DMRSs 415, a PSCCH 420 (carrying SCI-1), SCI-2 425, a SL-PRS burst including the SL-PRS 430, and one or more gap symbols 435. In some implementations, a first symbol portion 405 may be a repetition of a PSCCH 420, and a first symbol portion 410 may be a repetition of a DMRS 415 (for example, in a slot format associated with 14 total symbol duration). As shown in FIG. 4, the slot format may include an SL-PRS burst spanning eight symbols, although a slot format with an SL-PRS burst spanning four symbols may be adopted in some examples. In some implementations, the slot format may lack or be absent of a PSSCH (an SL-SCH). For example, instead of including a PSSCH portion, the slot format may include a portion dedicated for an SL-PRS burst.

The SL-PRS 430, which a UE (e.g., a sidelink anchor node) may transmit during an SL-PRS burst (a set of consecutive symbols), may feature or otherwise be associated with a transmission pattern, such as a staggered comb pattern, where the SL-PRS 430 may be distributed on different subsets of frequency resources in successive symbol durations. In some implementations, the SL-PRS 430 may feature or be associated with a similar structure or pattern as a Uu-PRS. In some implementations, one or both of a candidate slot and the SL-PRS pattern may be configured (for example, pre-configured) at a UE transmitting an SL-PRS 430, or a UE receiving an SL-PRS 430 may receive control signaling (such as SCI-2) indicating one or both of the candidate slot and the SL-PRS burst pattern.

Figure 5:
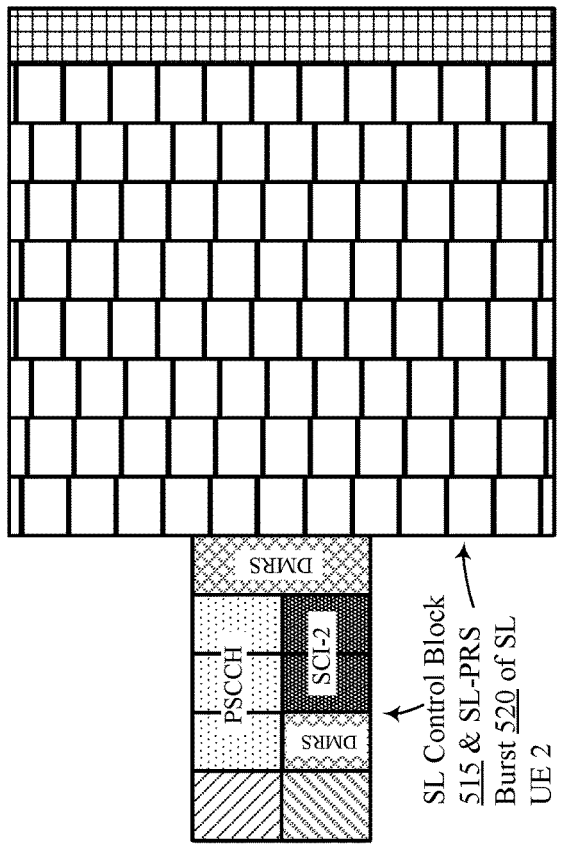
FIG. 5 illustrates an example of a PRS configuration that supports multiplexing sidelink PRS resources in accordance with aspects of the present disclosure.
Figure 5:
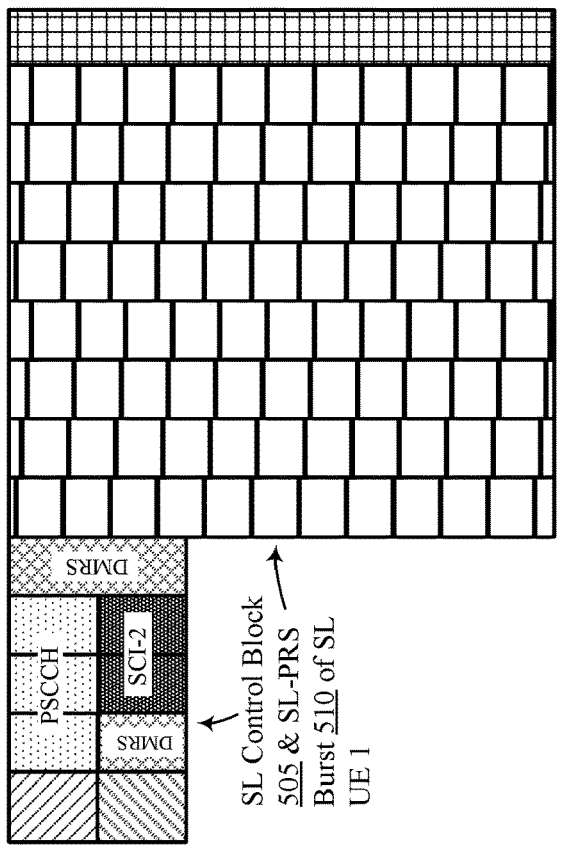
Figure 5:
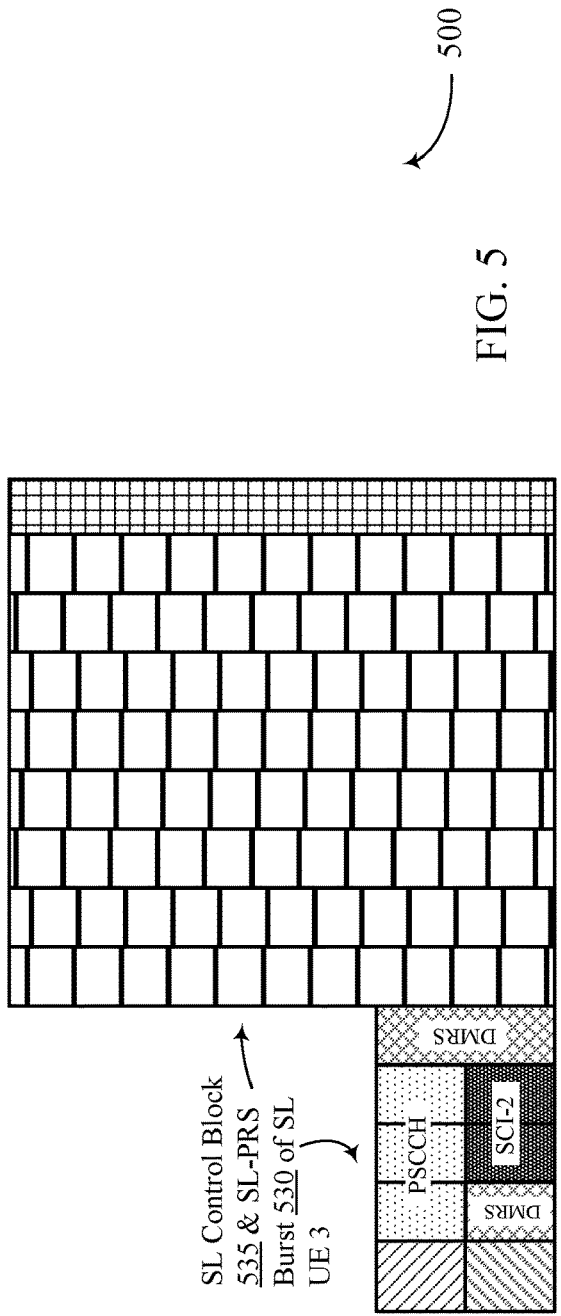

Accordingly, PRS configuration 400 illustrates an example where a sidelink control block and its associated SL-PRS burst are in different slots. In some examples, multiple SL-PRS bursts can be multiplexed on slot n+m (e.g., using FDM and tone interlacing), such as is illustrated in FIG. 5 below. For the SL-PRS bursts in slot n+m, anchor node 1 may transmit its sidelink control block in slot n and anchor node 2 may transmit its sidelink control block in slot n or in another slot occurring before slot n and/or slot n+m. When the sidelink control blocks from anchor nodes 1 and 2 are transmitted in different slots, this may utilize TDM techniques for the sidelink control blocks.

FIG. 5 illustrates an example of a PRS configuration 500 that supports multiplexing sidelink PRS resources in accordance with aspects of the present disclosure. PRS configuration 500 may implement or be implemented to realize aspects of the wireless communications systems 100 and/or 200 and/or PRS configurations 300 and/or 400. Aspects of PRS configuration 500 may implemented at or implemented by a UE, which may be an example of the corresponding device described herein. Broadly, PRS configuration 500 illustrates a non-limiting example where multiple SL-PRS burst from different anchor nodes (e.g., UEs) are multiplexed in the same slot.

That is, as discussed above a UE (e.g., a UE receiving SL-PRS bursts) may receive a plurality of sidelink control blocks from one or more sidelink UEs. In the non-limiting example illustrated in FIG. 5, this may include the UE receiving three sidelink control blocks from three sidelink UEs (e.g., from three sidelink anchor nodes). For example, the UE may receive a sidelink control block 505 from a first sidelink UE, a sidelink control block 515 from a second sidelink UE, and a third sidelink control block 525 from a third sidelink UE. Each sidelink control block may carry or otherwise convey an indication of a SL-PRS burst pattern for the respective sidelink UE. That is, each sidelink control block may carry or otherwise convey a TDRA, FDRA, etc., for the SL-PRS burst being scheduled by the respective sidelink UE. As discussed above, each sidelink control block may include one or more first symbol portions, a PSCCH (e.g., carrying a SCI-1), an SCI-2, and/or one or more DMRS.

The sidelink control blocks from the different sidelink UEs may be received in first frequency ranges and during a first time period. For example, each sidelink control block may be received in the same slot (e.g., the first time period in this example would correspond to the same slot) or may be received in different slots (e.g., the first time period in this example would correspond to the different slots). The sidelink control blocks may be received in the same frequency range (but in different slots, such as using TDM techniques) or in different frequency ranges (such as using FDM techniques). In the non-limiting example illustrated in FIG. 5, each sidelink control block is received in a different frequency ranges (e.g., in the first frequency range, but using different sub-channels, bandwidths, tones, etc.). That is, the sidelink control block 505 may be received from the first sidelink UE in a first subset of the first frequency range, the sidelink control block 515 received from the second sidelink UE in a second subset of the first frequency range, and the sidelink control block 525 received from the third sidelink UE in a third subset of the first frequency range.

The UE may then receive the SL-PRS burst from each sidelink UE according to the corresponding SL-PRS burst pattern indicated in the associated sidelink control block. That is, the UE may receive SL-PRS burst 510 from the first sidelink UE according to a first SL-PRS burst pattern, SL-PRS burst 520 from the second sidelink UE according to a second SL-PRS burst pattern, and SL-PRS burst 530 from the third sidelink UE according to a third SL-PRS burst pattern. As discussed above, each sidelink control block may indicate TDRA, FDRA, etc., for the corresponding SL-PRS burst. Accordingly, the UE may receive the plurality of multiplexed SL-PRS burst from the sidelink UEs multiplexed on different tones within the second frequency range according to the respective sidelink control block. That is, the SL-PRS bursts may have different tone offsets an occupy different sets of tones within the second frequency range. The tone offsets may be (pre)configured and/or indicated in the respective sidelink control blocks.

The UE may use the SL-PRS burst to measure, identify, or otherwise determine its own position and/or the position of surrounding objects (e.g., using reflections of the SL-PRS burst transmissions) based on the SL-PRS bursts.

Figure 6:
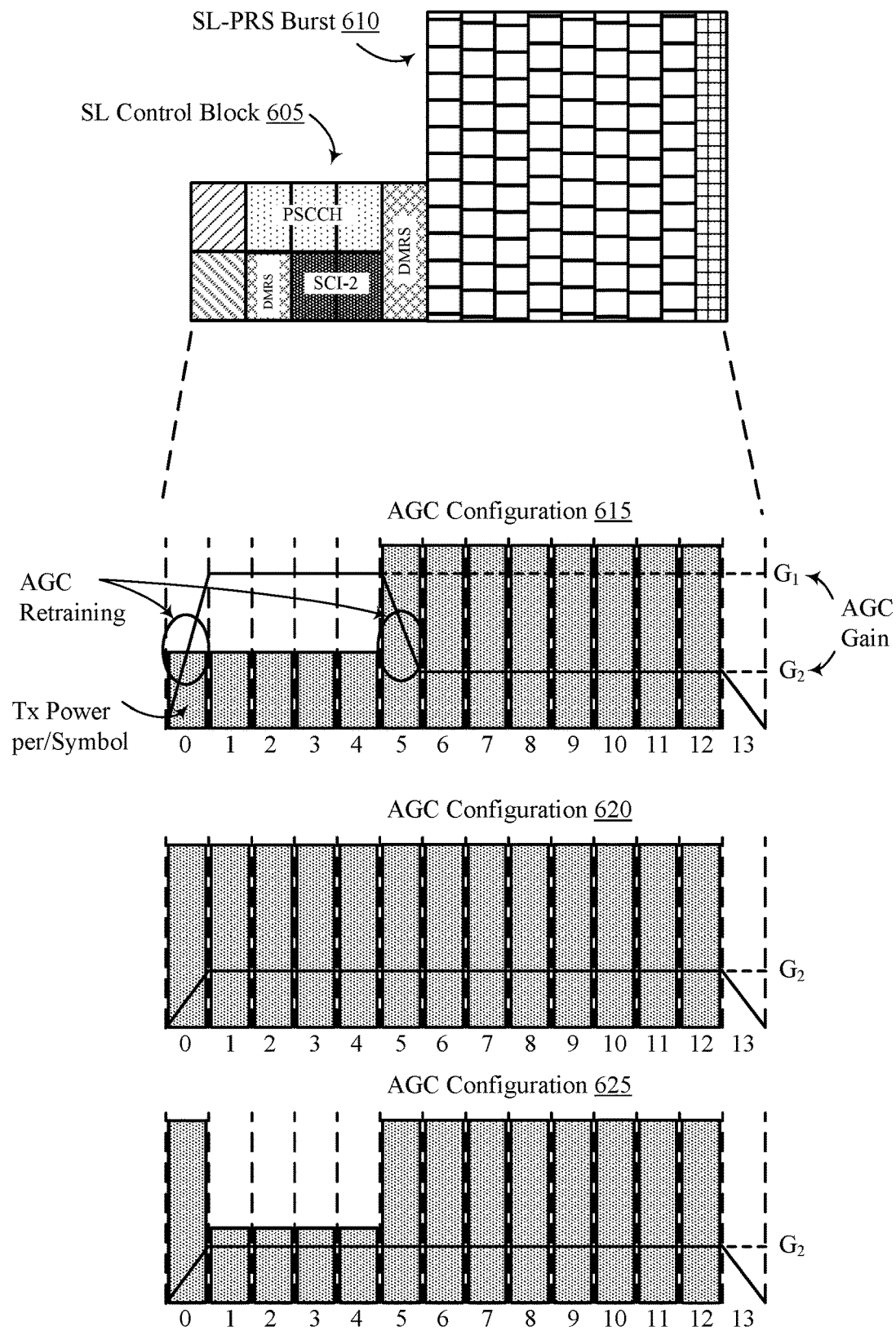
FIG. 6 illustrates an example of a PRS configuration that supports multiplexing sidelink PRS resources in accordance with aspects of the present disclosure.

FIG. 6 illustrates an example of a PRS configuration 600 that supports multiplexing sidelink PRS resources in accordance with aspects of the present disclosure. PRS configuration 600 may implement or be implemented to realize aspects of the wireless communications systems 100 and/or 200 and/or PRS configurations 300, 400, and/or 500. Aspects of PRS configuration 600 may implemented at or implemented by a UE, which may be an example of the corresponding device described herein. Broadly, PRS configuration 600 illustrates a non-limiting example where various power control and/or automatic gain control (AGC) functions are adopted with respect to the sidelink control block 605 and/or the associated SL-PRS burst 610.

That is, as discussed above a UE (e.g., a UE receiving SL-PRS bursts) may receive one or more sidelink control blocks 605 from a corresponding one or more sidelink UEs. Each sidelink control block may carry or otherwise convey an indication of a SL-PRS burst pattern for the respective sidelink UE. That is, each sidelink control block may carry or otherwise convey a TDRA, FDRA, etc., for the SL-PRS burst being scheduled by the respective sidelink UE. As discussed above, each sidelink control block 605 may include one or more first symbol portions, a PSCCH (e.g., carrying a SCI-1), an SCI-2, and/or one or more DMRS and the corresponding SL-PRS burst 610 may include the SL-PRS transmission(s) and one or more gap periods. The UE may receive the SL-PRS burst(s) 610 from the one or more sidelink UEs according to the SL-PRS burst patterns indicated in the corresponding sidelink control block 605.

As discussed above, various slot structures may be supported for the SL-PRS transmissions that support various transmit power control operations (e.g., at the UE transmitting the SL-PRS burst 610) and/or AGC operations (e.g., at the UE receiving the SL-PRS burst 610). That is, since the sidelink control block 605 and corresponding SL-PRS burst 610 may have different bandwidths and transmit power levels, aspects of the techniques described herein may support various considerations with respect to the AGC symbol (e.g., the first symbol of the SL-PRS slot, in some examples).

One consideration illustrated in AGC configuration 615 may include, when the SL-PRS burst 610 spans multiple symbols (e.g., staggered repetition with constant power, the first symbol may be used for AGC training for the SL-PRS burst 610. In AGC configuration 615, the sidelink control block 605 is transmitted in the first five symbols (symbols 0-4) using a first transmit power and the SL-PRS burst 610 is transmitted in the next eight symbols (symbols 5-12) using a second transmit power level that is higher than the first transmit power. The UE may determine that the plurality of multiplexed SL-PRS bursts are received in a plurality of symbols of a slot. Accordingly, the UE may perform a gain control function (e.g., an AGC function) during a first symbol (e.g., symbol 5) of the SL-PRS 610. That is, the UE may perform AGC retuning during symbol 0 based on the sidelink control block 605 and then perform AGC retuning during symbol 5 based on the SL-PRS burst 610. Each AGC retuning may be associated with a different gain function (e.g., $G_1$ and G2) that are each based on the transmit power level per symbol (e.g., the receive power level observed by the receiving UE) of the signal.

Another consideration illustrated in AGC configuration 615 may include, an additional SL-PRS burst symbol being added in the beginning of the SL-PRS burst 610 (e.g., symbol 5 is added to support AGC operations). The UE may identify or otherwise determine a gain control symbol associated with the SL-PRS burst 610. In the non-limiting example illustrated in AGC configuration 615, the gain control symbol (e.g., the AGC symbol) is added during symbol 5 of the slot. Accordingly, the UE may perform a gain control function (e.g., an AGC function) during the gain control symbol (e.g., symbol 5) of the SL-PRS 610. That is, the UE may perform AGC retuning during symbol 0 based on the sidelink control block 605 and then perform AGC retuning during symbol 5 based on the SL-PRS burst 610. The SL-PRS burst during symbol 5 of the slot is added to support AGC operations of the receiving UE, which may then be prepared to receive the SL-PRS burst 610 transmissions during symbols 6-12 of the slot. The gain control symbol (e.g., the AGC symbol) may be a copy of the SL-PRS burst receiving during symbol 6 of the slot.

Another consideration illustrated in AGC configuration 615 may include a power offset (e.g., a gain control offset) between the sidelink control block 605 and the associated SL-PRS burst 610. The power offset may be (pre)configured (e.g., using RRC messages, MAC CE, etc.) and/or indicated in the sidelink control block 605 (e.g., in SCI-1 and/or SCI-2). The receiving UE may use the power offset to adjust its AGC between reception of the sidelink control block 605 and the SL-PRS burst 610. Accordingly, the UE may identify the gain control offset (e.g., power offset) between the sidelink control block 605 and the SL-PRS burst 610 and perform a gain control function (e.g., AGC function) using the SL-PRS bursts 610 based on the gain control offset. For example, the UE may identify its gain control function (e.g., $G_1$) during symbol 0 of the slot. The UE may use the gain control offset to identify or otherwise determine its gain control function (e.g., $G_2$) during symbol 5. In this example, the gain control offset may correspond to the difference in transmit power/symbol between symbol 0 (e.g., the sidelink control block 605) and symbol 5 (e.g., the SL-PRS burst 610).

Another consideration illustrated in AGC configuration 620 may include the transmit power of the sidelink control block 605 and its associated SL-PRS burst 610 being configured such that the transmit power levels are the same. This may occur even when the sidelink control block are received in different frequency ranges, bandwidths, sub-channels, etc. The transmit power level per/symbol for the sidelink control block or for the SL-PRS burst 610 may be boosted to be the same. The receiving UE in this example may maintain its AGC state (e.g., $G_2$) for reception of the sidelink control block 605 and the SL-PRS burst 610. Accordingly, the UE may perform a gain control function using the sidelink control block 605 (and/or plurality of sidelink control blocks in the multiplexing examples) and determine its gain control (e.g., AGC, which may also be $G_2$) based on the gain control function. In this example, this may include the UE performing AGC retraining during symbol 0 of the slot and then, based on the same transmit power level between the sidelink control block 605 and the SL-PRS burst 610, use that AGC function (e.g., $G_2$) during reception of the SL-PRS burst 610.

Another consideration illustrated in AGC configuration 625 may include the transmit power of the AGC symbol being boosted to the maximum per-symbol average transmit power between the sidelink control block 605 and the SL-PRS burst 610. For example, if the SL-PRS burst 610 symbol has a larger transmit power than the associated sidelink control block 605 symbols, the AGC symbol power level may be boosted to have the same transmit power level as the SL-PRS burst 610 (e.g., just the first symbol, symbol 0 in this example), not the entire sidelink control block 605. Accordingly, a first gain control symbol (e.g., symbol 0 in this example) associated with the sidelink control block 605 may be within a threshold power level (e.g., boosted to) the SL-PRS burst 610. In this example, this may include the UE performing AGC retraining during symbol 0 (e.g., the boosted symbol, which may also be referred to as the gain control symbol) of the slot and then use the same AGC function $G_2$ during reception of the SL-PRS burst 610.

Certain of the considerations discussed above may be applicable depending on the time offset between the sidelink control block 605 and the SL-PRS burst 610. For example, if the time offset is large, there may be difficulties maintaining the same AGC state (e.g., $G_2$) for the duration of the timing offset.

Figure 7:
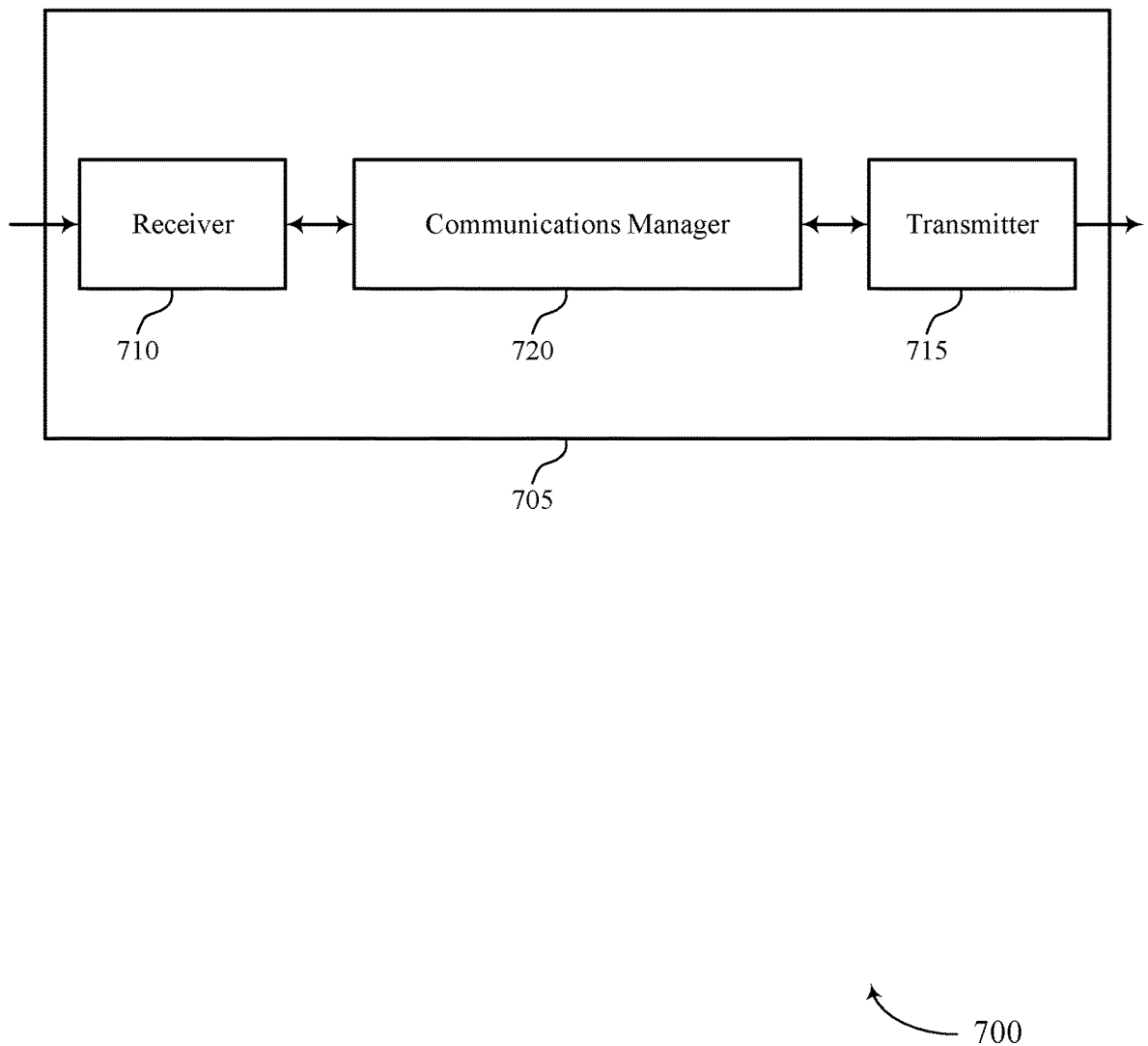
FIGS. 7 and 8 show block diagrams of devices that support multiplexing sidelink PRS resources in accordance with aspects of the present disclosure.

FIG. 7 shows a block diagram 700 of a device 705 that supports multiplexing sidelink PRS resources in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multiplexing sidelink PRS resources). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multiplexing sidelink PRS resources). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of multiplexing sidelink PRS resources as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, via first frequency ranges and first time periods, a set of multiple sidelink control blocks that each indicate a sidelink PRS burst pattern for one or more sidelink UEs. The communications manager 720 may be configured as or otherwise support a means for receiving, within a second frequency range and during a second time period, a set of multiple multiplexed sidelink PRSs from the one or more sidelink UEs in accordance with the sidelink PRS burst patterns. The communications manager 720 may be configured as or otherwise support a means for determining a position of the UE based on the receiving of the set of multiple multiplexed sidelink PRSs.

Additionally, or alternatively, the communications manager 720 may support wireless communication at a UE in accordance with examples as disclosed herein. For example, the communications manager 720 may be configured as or otherwise support a means for receiving, from a sidelink UE, a sidelink control block during a first slot, the sidelink control block indicating a sidelink PRS burst pattern for the sidelink UE. The communications manager 720 may be configured as or otherwise support a means for receiving, from the sidelink UE and according to the sidelink PRS burst pattern, a set of multiple multiplexed sidelink PRSs during a second slot that is different from the first slot. The communications manager 720 may be configured as or otherwise support a means for determining a position of the UE based on receiving the set of multiple multiplexed sidelink PRSs.

Additionally, or alternatively, the communications manager 720 may support wireless communication at a UE in accordance with examples as disclosed herein. For example, the communications manager 720 may be configured as or otherwise support a means for receiving, from a sidelink UE, a sidelink control block in a first frequency range, the sidelink control block indicating a sidelink PRS burst pattern for the sidelink UE. The communications manager 720 may be configured as or otherwise support a means for receiving, from the sidelink UE and according to the sidelink PRS burst pattern, a set of multiple multiplexed sidelink PRSs in a second frequency range that is different from the first frequency range. The communications manager 720 may be configured as or otherwise support a means for determining a position of the UE based on receiving the set of multiple multiplexed sidelink PRSs.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for multiplexing sidelink control blocks and the associated SL-PRS bursts from multiple sidelink UE in the same slot or in different slots and/or in the same frequency range or in different frequency ranges for the SL-PRS burst occurring in a same slot.

Figure 8:
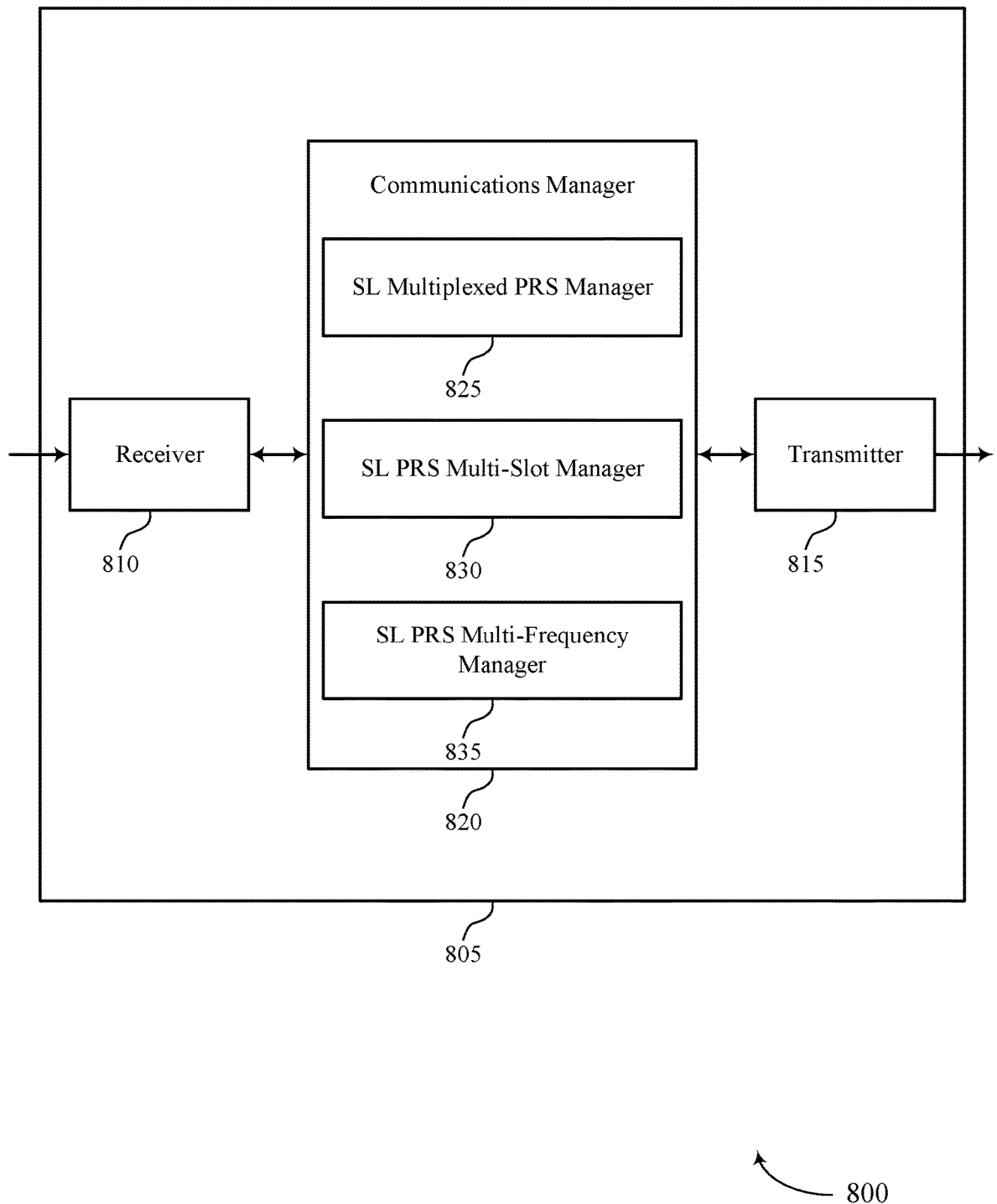

FIG. 8 shows a block diagram 800 of a device 805 that supports multiplexing sidelink PRS resources in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multiplexing sidelink PRS resources). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multiplexing sidelink PRS resources). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of multiplexing sidelink PRS resources as described herein. For example, the communications manager 820 may include an SL multiplexed PRS manager 825, an SL PRS multi-slot manager 830, an SL PRS multi-frequency manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The SL multiplexed PRS manager 825 may be configured as or otherwise support a means for receiving, via first frequency ranges and first time periods, a set of multiple sidelink control blocks that each indicate a sidelink PRS burst pattern for one or more sidelink UEs. The SL multiplexed PRS manager 825 may be configured as or otherwise support a means for receiving, within a second frequency range and during a second time period, a set of multiple multiplexed sidelink PRSs from the one or more sidelink UEs in accordance with the sidelink PRS burst patterns. The SL multiplexed PRS manager 825 may be configured as or otherwise support a means for determining a position of the UE based on the receiving of the set of multiple multiplexed sidelink PRSs.

Additionally, or alternatively, the communications manager 820 may support wireless communication at a UE in accordance with examples as disclosed herein. The SL PRS multi-slot manager 830 may be configured as or otherwise support a means for receiving, from a sidelink UE, a sidelink control block during a first slot, the sidelink control block indicating a sidelink PRS burst pattern for the sidelink UE. The SL PRS multi-slot manager 830 may be configured as or otherwise support a means for receiving, from the sidelink UE and according to the sidelink PRS burst pattern, a set of multiple multiplexed sidelink PRSs during a second slot that is different from the first slot. The SL PRS multi-slot manager 830 may be configured as or otherwise support a means for determining a position of the UE based on receiving the set of multiple multiplexed sidelink PRSs.

Additionally, or alternatively, the communications manager 820 may support wireless communication at a UE in accordance with examples as disclosed herein. The SL PRS multi-frequency manager 835 may be configured as or otherwise support a means for receiving, from a sidelink UE, a sidelink control block in a first frequency range, the sidelink control block indicating a sidelink PRS burst pattern for the sidelink UE. The SL PRS multi-frequency manager 835 may be configured as or otherwise support a means for receiving, from the sidelink UE and according to the sidelink PRS burst pattern, a set of multiple multiplexed sidelink PRSs in a second frequency range that is different from the first frequency range. The SL PRS multi-frequency manager 835 may be configured as or otherwise support a means for determining a position of the UE based on receiving the set of multiple multiplexed sidelink PRSs.

Figure 9:
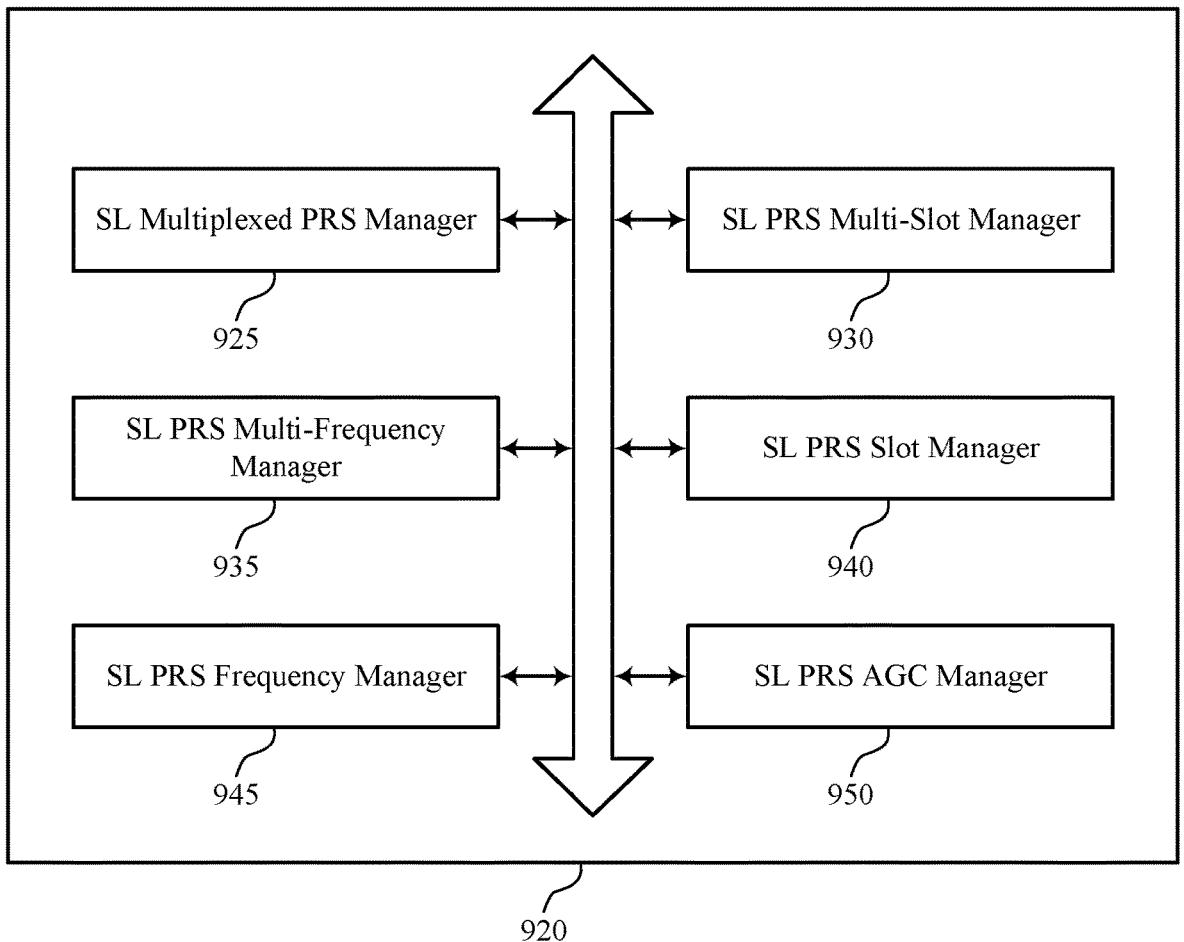
FIG. 9 shows a block diagram of a communications manager that supports multiplexing sidelink PRS resources in accordance with aspects of the present disclosure.

FIG. 9 shows a block diagram 900 of a communications manager 920 that supports multiplexing sidelink PRS resources in accordance with aspects of the present disclosure. The communications manager 920 may be an example of aspects of a communications manager 720, a communications manager 820, or both, as described herein. The communications manager 920, or various components thereof, may be an example of means for performing various aspects of multiplexing sidelink PRS resources as described herein. For example, the communications manager 920 may include an SL multiplexed PRS manager 925, an SL PRS multi-slot manager 930, an SL PRS multi-frequency manager 935, an SL PRS slot manager 940, an SL PRS frequency manager 945, an SL PRS AGC manager 950, or any combination thereof. Each of these components may communicate, directly or indirectly, with one another (e.g., via one or more buses).

The communications manager 920 may support wireless communication at a UE in accordance with examples as disclosed herein. The SL multiplexed PRS manager 925 may be configured as or otherwise support a means for receiving, via first frequency ranges and first time periods, a set of multiple sidelink control blocks that each indicate a sidelink PRS burst pattern for one or more sidelink UEs. In some examples, the SL multiplexed PRS manager 925 may be configured as or otherwise support a means for receiving, within a second frequency range and during a second time period, a set of multiple multiplexed sidelink PRSs from the one or more sidelink UEs in accordance with the sidelink PRS burst patterns. In some examples, the SL multiplexed PRS manager 925 may be configured as or otherwise support a means for determining a position of the UE based on the receiving of the set of multiple multiplexed sidelink PRSs.

In some examples, to support receiving the set of multiple sidelink control blocks, the SL PRS slot manager 940 may be configured as or otherwise support a means for receiving the set of multiple sidelink control blocks during a first subset of symbols of a slot, where the first time periods are each within the first subset of symbols of the slot and where the second time period is a second subset of symbols of the slot subsequent to the first subset of symbols of the slot.

In some examples, to support receiving the set of multiple sidelink control blocks, the SL PRS slot manager 940 may be configured as or otherwise support a means for receiving the set of multiple sidelink control blocks in different first slots, where the first time periods are within the different first slots and where the second time period is a second slot subsequent to the different first slots.

In some examples, to support receiving the set of multiple sidelink control blocks, the SL PRS frequency manager 945 may be configured as or otherwise support a means for receiving at least one of the set of multiple sidelink control blocks in a frequency range of the first frequency ranges that overlaps in frequency with the second frequency range. In some examples, to support receiving the set of multiple sidelink control blocks, the SL PRS frequency manager 945 may be configured as or otherwise support a means for receiving at least one of the set of multiple sidelink control blocks in a frequency range of the first frequency ranges that does not overlap in frequency with the second frequency range.

In some examples, the SL PRS frequency manager 945 may be configured as or otherwise support a means for receiving the set of multiple multiplexed sidelink PRSs from the one or more sidelink UEs multiplexed on different tones within the second frequency range and during the second time period in accordance with the sidelink PRS burst patterns.

In some examples, the SL PRS AGC manager 950 may be configured as or otherwise support a means for determining, based on the set of multiple sidelink control blocks, that the set of multiple multiplexed sidelink PRSs are received in a set of multiple symbols of a slot. In some examples, the SL PRS AGC manager 950 may be configured as or otherwise support a means for performing a gain control function using the set of multiple multiplexed sidelink PRSs during a first symbol of the set of multiple symbols.

In some examples, the SL PRS AGC manager 950 may be configured as or otherwise support a means for identifying, based on the set of multiple sidelink control blocks, a gain control symbol associated with the set of multiple multiplexed sidelink PRSs. In some examples, the SL PRS AGC manager 950 may be configured as or otherwise support a means for performing a gain control function using the set of multiple multiplexed sidelink PRSs during the gain control symbol.

In some examples, the SL PRS AGC manager 950 may be configured as or otherwise support a means for identifying a gain control offset between the set of multiple sidelink control blocks and the set of multiple multiplexed sidelink PRSs. In some examples, the SL PRS AGC manager 950 may be configured as or otherwise support a means for performing a gain control function using the set of multiple multiplexed sidelink PRSs based on the gain control offset.

In some examples, the SL PRS AGC manager 950 may be configured as or otherwise support a means for identifying the gain control offset based on the set of multiple sidelink control blocks, on one or more radio resource control messages, or both. In some examples, the SL PRS AGC manager 950 may be configured as or otherwise support a means for performing a gain control function using the set of multiple sidelink control blocks. In some examples, the SL PRS AGC manager 950 may be configured as or otherwise support a means for determining a gain control associated with the set of multiple multiplexed sidelink PRSs based on the gain control function.

In some examples, a first gain control symbol associated with the set of multiple sidelink control blocks is within a threshold power level of the set of multiple multiplexed sidelink PRSs. In some examples, each sidelink control block indicates a frequency domain resource allocation and a time domain resource allocation of the set of multiple multiplexed sidelink PRSs for one of the one or more sidelink UEs. In some examples, each sidelink control block includes a PSCCH SCI-1, a PSSCH SCI-2, one or more DMRSs, or a combination thereof. In some examples, the second frequency range is a larger bandwidth than individual ones of the first frequency ranges.

Additionally, or alternatively, the communications manager 920 may support wireless communication at a UE in accordance with examples as disclosed herein. The SL PRS multi-slot manager 930 may be configured as or otherwise support a means for receiving, from a sidelink UE, a sidelink control block during a first slot, the sidelink control block indicating a sidelink PRS burst pattern for the sidelink UE. In some examples, the SL PRS multi-slot manager 930 may be configured as or otherwise support a means for receiving, from the sidelink UE and according to the sidelink PRS burst pattern, a set of multiple multiplexed sidelink PRSs during a second slot that is different from the first slot. In some examples, the SL PRS multi-slot manager 930 may be configured as or otherwise support a means for determining a position of the UE based on receiving the set of multiple multiplexed sidelink PRSs.

In some examples, the SL PRS frequency manager 945 may be configured as or otherwise support a means for receiving the sidelink control block in a first frequency range and the set of multiple multiplexed sidelink PRSs in a second frequency range that is different from the first frequency range. In some examples, the first frequency range is a subset frequency range within the second frequency range. In some examples, the first frequency range does not overlap in frequency with the second frequency range. In some examples, the sidelink control block indicates a frequency domain resource allocation and a time domain resource allocation of the set of multiple multiplexed sidelink PRSs for the sidelink UE. In some examples, the sidelink control block includes a PSCCH SCI-1, a PSSCH SCI-2, one or more DMRSs, or a combination thereof.

Additionally, or alternatively, the communications manager 920 may support wireless communication at a UE in accordance with examples as disclosed herein. The SL PRS multi-frequency manager 935 may be configured as or otherwise support a means for receiving, from a sidelink UE, a sidelink control block in a first frequency range, the sidelink control block indicating a sidelink PRS burst pattern for the sidelink UE. In some examples, the SL PRS multi-frequency manager 935 may be configured as or otherwise support a means for receiving, from the sidelink UE and according to the sidelink PRS burst pattern, a set of multiple multiplexed sidelink PRSs in a second frequency range that is different from the first frequency range. In some examples, the SL PRS multi-frequency manager 935 may be configured as or otherwise support a means for determining a position of the UE based on receiving the set of multiple multiplexed sidelink PRSs.

In some examples, the SL PRS slot manager 940 may be configured as or otherwise support a means for receiving the sidelink control block during a first subset of symbols of a slot and the set of multiple multiplexed sidelink PRSs during a second subset of symbols of the slot subsequent to the first subset of symbols.

In some examples, the SL PRS slot manager 940 may be configured as or otherwise support a means for receiving the sidelink control block during a first slot and the set of multiple multiplexed sidelink PRSs during a second slot subsequent to the first slot. In some examples, the first frequency range is a subset frequency range within the second frequency range. In some examples, the first frequency range does not overlap in frequency with the second frequency range. In some examples, the sidelink control block indicates a frequency domain resource allocation and a time domain resource allocation of the set of multiple multiplexed sidelink PRSs for the sidelink UE. In some examples, the sidelink control block includes a PSCCH SCI-1, a PSSCH SCI-2, one or more DMRSs, or a combination thereof.

Figure 10:
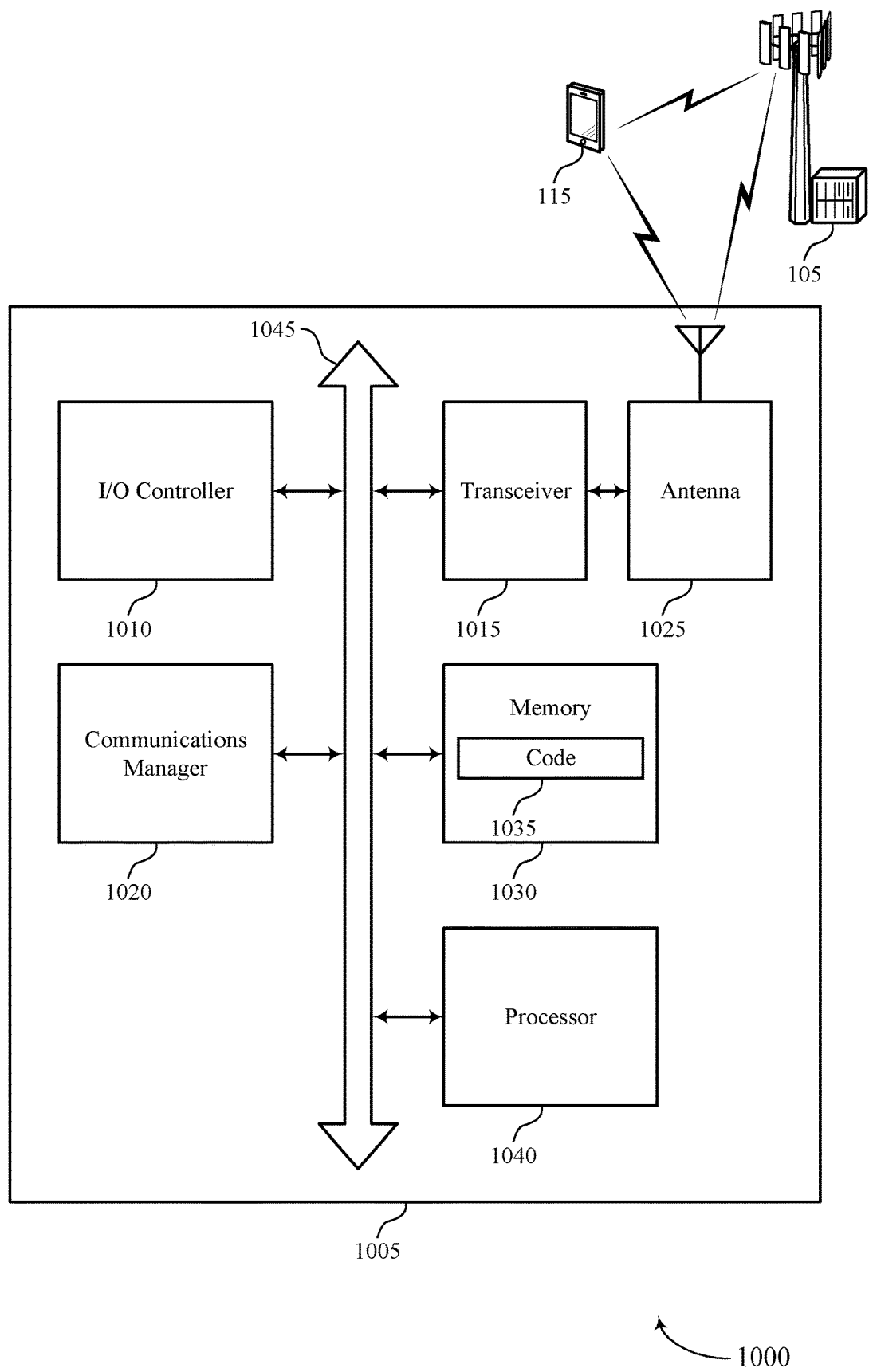
FIG. 10 shows a diagram of a system including a device that supports multiplexing sidelink PRS resources in accordance with aspects of the present disclosure.

FIG. 10 shows a diagram of a system 1000 including a device 1005 that supports multiplexing sidelink PRS resources in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multiplexing sidelink PRS resources). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, via first frequency ranges and first time periods, a set of multiple sidelink control blocks that each indicate a sidelink PRS burst pattern for one or more sidelink UEs. The communications manager 1020 may be configured as or otherwise support a means for receiving, within a second frequency range and during a second time period, a set of multiple multiplexed sidelink PRSs from the one or more sidelink UEs in accordance with the sidelink PRS burst patterns. The communications manager 1020 may be configured as or otherwise support a means for determining a position of the UE based on the receiving of the set of multiple multiplexed sidelink PRSs.

Additionally, or alternatively, the communications manager 1020 may support wireless communication at a UE in accordance with examples as disclosed herein. For example, the communications manager 1020 may be configured as or otherwise support a means for receiving, from a sidelink UE, a sidelink control block during a first slot, the sidelink control block indicating a sidelink PRS burst pattern for the sidelink UE. The communications manager 1020 may be configured as or otherwise support a means for receiving, from the sidelink UE and according to the sidelink PRS burst pattern, a set of multiple multiplexed sidelink PRSs during a second slot that is different from the first slot. The communications manager 1020 may be configured as or otherwise support a means for determining a position of the UE based on receiving the set of multiple multiplexed sidelink PRSs.

Additionally, or alternatively, the communications manager 1020 may support wireless communication at a UE in accordance with examples as disclosed herein. For example, the communications manager 1020 may be configured as or otherwise support a means for receiving, from a sidelink UE, a sidelink control block in a first frequency range, the sidelink control block indicating a sidelink PRS burst pattern for the sidelink UE. The communications manager 1020 may be configured as or otherwise support a means for receiving, from the sidelink UE and according to the sidelink PRS burst pattern, a set of multiple multiplexed sidelink PRSs in a second frequency range that is different from the first frequency range. The communications manager 1020 may be configured as or otherwise support a means for determining a position of the UE based on receiving the set of multiple multiplexed sidelink PRSs.

By including or configuring the communications manager 1020 in accordance with examples as described herein, the device 1005 may support techniques for multiplexing sidelink control blocks and the associated SL-PRS bursts from multiple sidelink UE in the same slot or in different slots and/or in the same frequency range or in different frequency ranges for the SL-PRS burst occurring in a same slot.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of multiplexing sidelink PRS resources as described herein, or the processor 1040 and the memory 1030 may be otherwise configured to perform or support such operations.

Figure 11:
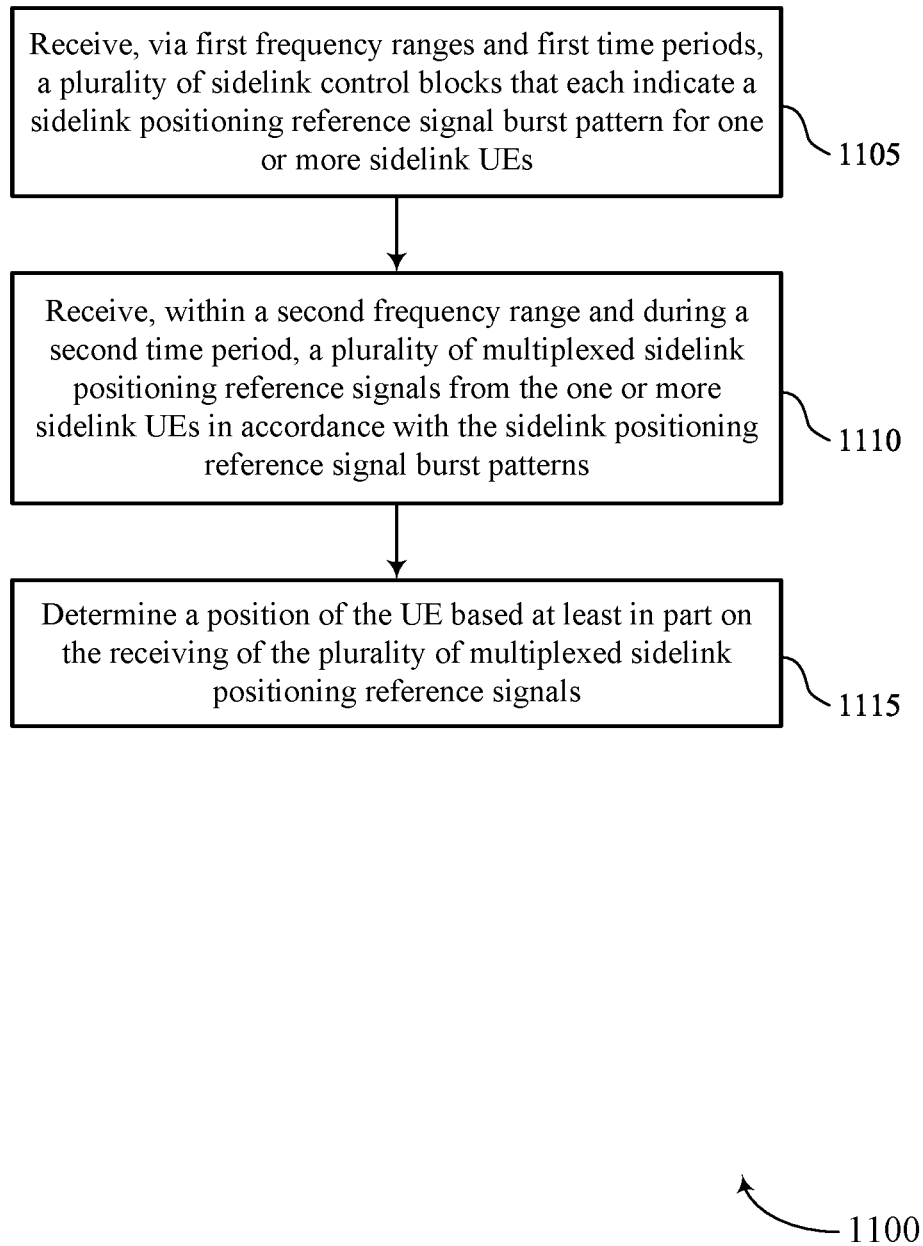
FIGS. 11 through 14 show flowcharts illustrating methods that support multiplexing sidelink PRS resources in accordance with aspects of the present disclosure.

FIG. 11 shows a flowchart illustrating a method 1100 that supports multiplexing sidelink PRS resources in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving, via first frequency ranges and first time periods, a set of multiple sidelink control blocks that each indicate a sidelink PRS burst pattern for one or more sidelink UEs. The operations of 1105 may be performed in accordance with examples as disclosed herein. In some examples, aspects of the operations of 1105 may be performed by an SL multiplexed PRS manager 925 as described with reference to FIG. 9.

At 1110, the method may include receiving, within a second frequency range and during a second time period, a set of multiple multiplexed sidelink PRSs from the one or more sidelink UEs in accordance with the sidelink PRS burst patterns. The operations of 1110 may be performed in accordance with examples as disclosed herein. In some examples, aspects of the operations of 1110 may be performed by an SL multiplexed PRS manager 925 as described with reference to FIG. 9.

At 1115, the method may include determining a position of the UE based on the receiving of the set of multiple multiplexed sidelink PRSs. The operations of 1115 may be performed in accordance with examples as disclosed herein. In some examples, aspects of the operations of 1115 may be performed by an SL multiplexed PRS manager 925 as described with reference to FIG. 9.

Figure 12:
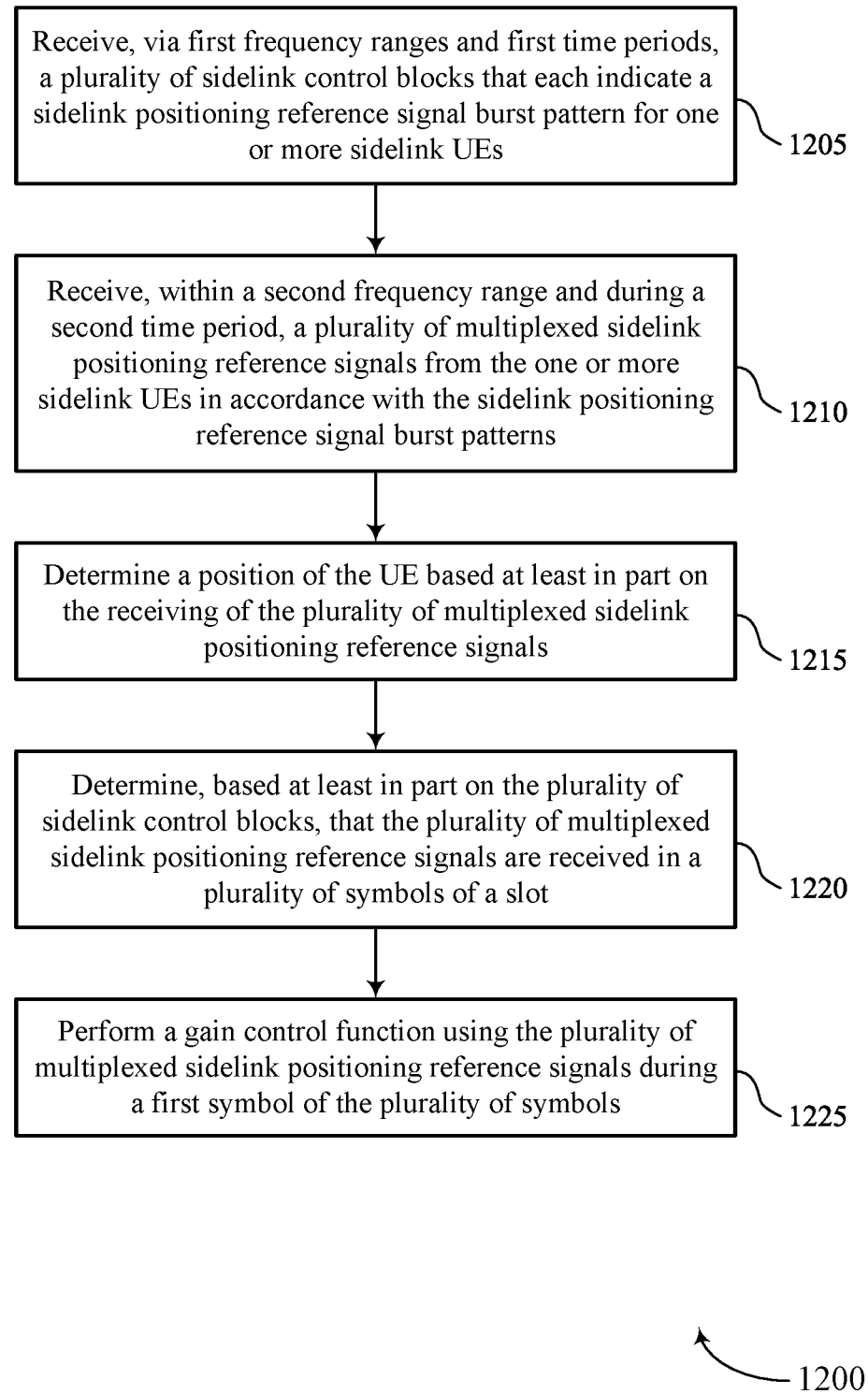

FIG. 12 shows a flowchart illustrating a method 1200 that supports multiplexing sidelink PRS resources in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving, via first frequency ranges and first time periods, a set of multiple sidelink control blocks that each indicate a sidelink PRS burst pattern for one or more sidelink UEs. The operations of 1205 may be performed in accordance with examples as disclosed herein. In some examples, aspects of the operations of 1205 may be performed by an SL multiplexed PRS manager 925 as described with reference to FIG. 9.

At 1210, the method may include receiving, within a second frequency range and during a second time period, a set of multiple multiplexed sidelink PRSs from the one or more sidelink UEs in accordance with the sidelink PRS burst patterns. The operations of 1210 may be performed in accordance with examples as disclosed herein. In some examples, aspects of the operations of 1210 may be performed by an SL multiplexed PRS manager 925 as described with reference to FIG. 9.

At 1215, the method may include determining a position of the UE based on the receiving of the set of multiple multiplexed sidelink PRSs. The operations of 1215 may be performed in accordance with examples as disclosed herein. In some examples, aspects of the operations of 1215 may be performed by an SL multiplexed PRS manager 925 as described with reference to FIG. 9.

At 1220, the method may include determining, based on the set of multiple sidelink control blocks, that the set of multiple multiplexed sidelink PRSs are received in a set of multiple symbols of a slot. The operations of 1220 may be performed in accordance with examples as disclosed herein. In some examples, aspects of the operations of 1220 may be performed by an SL PRS AGC manager 950 as described with reference to FIG. 9.

At 1225, the method may include performing a gain control function using the set of multiple multiplexed sidelink PRSs during a first symbol of the set of multiple symbols. The operations of 1225 may be performed in accordance with examples as disclosed herein. In some examples, aspects of the operations of 1225 may be performed by an SL PRS AGC manager 950 as described with reference to FIG. 9.

Figure 13:
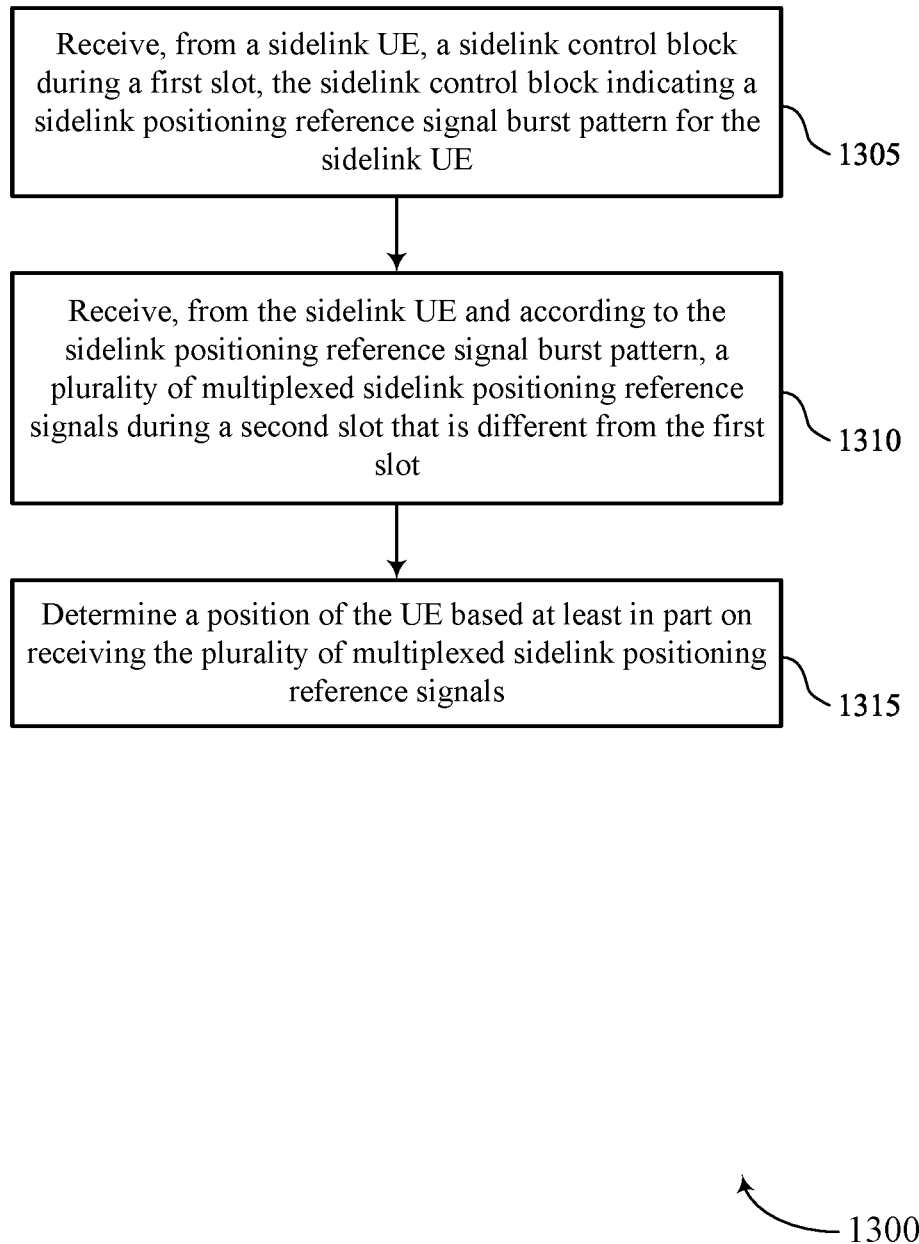

FIG. 13 shows a flowchart illustrating a method 1300 that supports multiplexing sidelink PRS resources in accordance with aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include receiving, from a sidelink UE, a sidelink control block during a first slot, the sidelink control block indicating a sidelink PRS burst pattern for the sidelink UE. The operations of 1305 may be performed in accordance with examples as disclosed herein. In some examples, aspects of the operations of 1305 may be performed by an SL PRS multi-slot manager 930 as described with reference to FIG. 9.

At 1310, the method may include receiving, from the sidelink UE and according to the sidelink PRS burst pattern, a set of multiple multiplexed sidelink PRSs during a second slot that is different from the first slot. The operations of 1310 may be performed in accordance with examples as disclosed herein. In some examples, aspects of the operations of 1310 may be performed by an SL PRS multi-slot manager 930 as described with reference to FIG. 9.

At 1315, the method may include determining a position of the UE based on receiving the set of multiple multiplexed sidelink PRSs. The operations of 1315 may be performed in accordance with examples as disclosed herein. In some examples, aspects of the operations of 1315 may be performed by an SL PRS multi-slot manager 930 as described with reference to FIG. 9.

Figure 14:
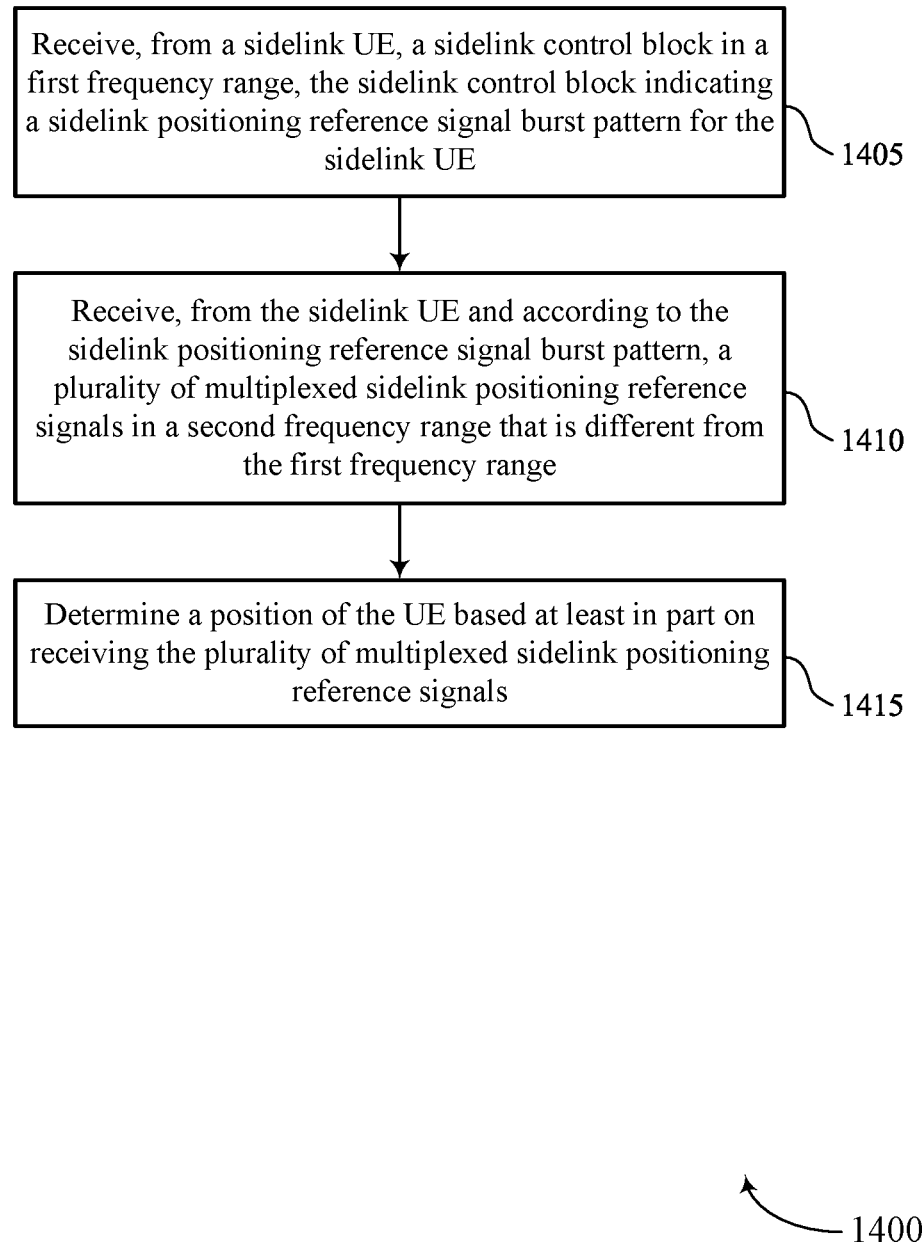

FIG. 14 shows a flowchart illustrating a method 1400 that supports multiplexing sidelink PRS resources in accordance with aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include receiving, from a sidelink UE, a sidelink control block in a first frequency range, the sidelink control block indicating a sidelink PRS burst pattern for the sidelink UE. The operations of 1405 may be performed in accordance with examples as disclosed herein. In some examples, aspects of the operations of 1405 may be performed by an SL PRS multi-frequency manager 935 as described with reference to FIG. 9.

At 1410, the method may include receiving, from the sidelink UE and according to the sidelink PRS burst pattern, a set of multiple multiplexed sidelink PRSs in a second frequency range that is different from the first frequency range. The operations of 1410 may be performed in accordance with examples as disclosed herein. In some examples, aspects of the operations of 1410 may be performed by an SL PRS multi-frequency manager 935 as described with reference to FIG. 9.

At 1415, the method may include determining a position of the UE based on receiving the set of multiple multiplexed sidelink PRSs. The operations of 1415 may be performed in accordance with examples as disclosed herein. In some examples, aspects of the operations of 1415 may be performed by an SL PRS multi-frequency manager 935 as described with reference to FIG. 9.

The Following Provides an Overview of Aspects of the Present Disclosure:

Aspect 1: A method for wireless communication at a UE, comprising: receiving, via first frequency ranges and first time periods, a plurality of sidelink control blocks that each indicate a sidelink PRS burst pattern for one or more sidelink UEs; receiving, within a second frequency range and during a second time period, a plurality of multiplexed sidelink PRSs from the one or more sidelink UEs in accordance with the sidelink PRS burst patterns; and determining a position of the UE based at least in part on the receiving of the plurality of multiplexed sidelink PRSs.

Aspect 2: The method of aspect 1, wherein receiving the plurality of sidelink control blocks further comprises: receiving the plurality of sidelink control blocks during a first subset of symbols of a slot, wherein the first time periods are each within the first subset of symbols of the slot and wherein the second time period is a second subset of symbols of the slot subsequent to the first subset of symbols of the slot.

Aspect 3: The method of any of aspects 1 through 2, wherein receiving the plurality of sidelink control blocks further comprises: receiving the plurality of sidelink control blocks in different first slots, wherein the first time periods are within the different first slots and wherein the second time period is a second slot subsequent to the different first slots.

Aspect 4: The method of any of aspects 1 through 3, wherein receiving the plurality of sidelink control blocks further comprises: receiving at least one of the plurality of sidelink control blocks in a frequency range of the first frequency ranges that overlaps in frequency with the second frequency range.

Aspect 5: The method of any of aspects 1 through 4, wherein receiving the plurality of sidelink control blocks further comprises: receiving at least one of the plurality of sidelink control blocks in a frequency range of the first frequency ranges that does not overlap in frequency with the second frequency range.

Aspect 6: The method of any of aspects 1 through 5, further comprising: receiving the plurality of multiplexed sidelink PRSs from the one or more sidelink UEs multiplexed on different tones within the second frequency range and during the second time period in accordance with the sidelink PRS burst patterns.

Aspect 7: The method of any of aspects 1 through 6, further comprising: determining, based at least in part on the plurality of sidelink control blocks, that the plurality of multiplexed sidelink PRSs are received in a plurality of symbols of a slot; and performing a gain control function using the plurality of multiplexed sidelink PRSs during a first symbol of the plurality of symbols.

Aspect 8: The method of any of aspects 1 through 7, further comprising: identifying, based at least in part on the plurality of sidelink control blocks, a gain control symbol associated with the plurality of multiplexed sidelink PRSs; and performing a gain control function using the plurality of multiplexed sidelink PRSs during the gain control symbol.

Aspect 9: The method of any of aspects 1 through 8, further comprising: identifying a gain control offset between the plurality of sidelink control blocks and the plurality of multiplexed sidelink PRSs; and performing a gain control function using the plurality of multiplexed sidelink PRSs based at least in part on the gain control offset.

Aspect 10: The method of aspect 9, further comprising: identifying the gain control offset based at least in part on the plurality of sidelink control blocks, on one or more RRC messages, or both.

Aspect 11: The method of any of aspects 1 through 10, further comprising: performing a gain control function using the plurality of sidelink control blocks; and determining a gain control associated with the plurality of multiplexed sidelink PRSs based at least in part on the gain control function.

Aspect 12: The method of any of aspects 1 through 11, wherein a first gain control symbol associated with the plurality of sidelink control blocks is within a threshold power level of the plurality of multiplexed sidelink PRSs.

Aspect 13: The method of any of aspects 1 through 12, wherein each sidelink control block indicates a FDRA and a TDRA of the plurality of multiplexed sidelink PRSs for one of the one or more sidelink UEs.

Aspect 14: The method of any of aspects 1 through 13, wherein each sidelink control block comprises a PSCCH SCI-1, a PSSCH SCI-2, one or more DMRSs, or a combination thereof.

Aspect 15: The method of any of aspects 1 through 14, wherein the second frequency range is a larger bandwidth than individual ones of the first frequency ranges.

Aspect 16: A method for wireless communication at a UE, comprising: receiving, from a sidelink UE, a sidelink control block during a first slot, the sidelink control block indicating a sidelink PRS burst pattern for the sidelink UE; receiving, from the sidelink UE and according to the sidelink PRS burst pattern, a plurality of multiplexed sidelink PRSs during a second slot that is different from the first slot; and determining a position of the UE based at least in part on receiving the plurality of multiplexed sidelink PRSs.

Aspect 17: The method of aspect 16, further comprising: receiving the sidelink control block in a first frequency range and the plurality of multiplexed sidelink PRSs in a second frequency range that is different from the first frequency range.

Aspect 18: The method of aspect 17, wherein the first frequency range is a subset frequency range within the second frequency range.

Aspect 19: The method of any of aspects 17 through 18, wherein the first frequency range does not overlap in frequency with the second frequency range.

Aspect 20: The method of any of aspects 16 through 19, wherein the sidelink control block indicates a FDRA and a TDRA of the plurality of multiplexed sidelink PRSs for the sidelink UE.

Aspect 21: The method of any of aspects 16 through 20, wherein the sidelink control block comprises a PSCCH SCI-1, a PSSCH SCI-2, one or more DMRSs, or a combination thereof.

Aspect 22: A method for wireless communication at a UE, comprising: receiving, from a sidelink UE, a sidelink control block in a first frequency range, the sidelink control block indicating a sidelink PRS burst pattern for the sidelink UE; receiving, from the sidelink UE and according to the sidelink PRS burst pattern, a plurality of multiplexed sidelink PRSs in a second frequency range that is different from the first frequency range; and determining a position of the UE based at least in part on receiving the plurality of multiplexed sidelink PRSs.

Aspect 23: The method of aspect 22, further comprising: receiving the sidelink control block during a first subset of symbols of a slot and the plurality of multiplexed sidelink PRSs during a second subset of symbols of the slot subsequent to the first subset of symbols.

Aspect 24: The method of any of aspects 22 through 23, further comprising: receiving the sidelink control block during a first slot and the plurality of multiplexed sidelink PRSs during a second slot subsequent to the first slot.

Aspect 25: The method of any of aspects 22 through 24, wherein the first frequency range is a subset frequency range within the second frequency range.

Aspect 26: The method of any of aspects 22 through 25, wherein the first frequency range does not overlap in frequency with the second frequency range.

Aspect 27: The method of any of aspects 22 through 26, wherein the sidelink control block indicates a FDRA and a TDRA of the plurality of multiplexed sidelink PRSs for the sidelink UE.

Aspect 28: The method of any of aspects 22 through 27, wherein the sidelink control block comprises a PSCCH SCI-1, a PSSCH SCI-2, one or more DMRSs, or a combination thereof.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a UE, comprising a processor; memory coupled with the processor; and instructions stored in the memory and executable by the processor to cause the apparatus to perform a method of any of aspects 16 through 21.

Aspect 33: An apparatus for wireless communication at a UE, comprising at least one means for performing a method of any of aspects 16 through 21.

Aspect 34: A non-transitory computer-readable medium storing code for wireless communication at a UE, the code comprising instructions executable by a processor to perform a method of any of aspects 16 through 21.

Aspect 35: An apparatus for wireless communication at a UE, comprising a processor; memory coupled with the processor; and instructions stored in the memory and executable by the processor to cause the apparatus to perform a method of any of aspects 22 through 28.

Aspect 36: An apparatus for wireless communication at a UE, comprising at least one means for performing a method of any of aspects 22 through 28.

Aspect 37: A non-transitory computer-readable medium storing code for wireless communication at a UE, the code comprising instructions executable by a processor to perform a method of any of aspects 22 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, via first frequency ranges and first time periods, a plurality of sidelink control blocks that each indicate a sidelink positioning reference signal burst pattern for one or more sidelink UEs, wherein each of the plurality of sidelink control blocks comprises a physical sidelink control channel (PSCCH) sidelink control information-1 (SCI-1), a physical sidelink shared channel (PSSCH) sidelink control information-2 (SCI-2) that indicates the sidelink positioning reference signal burst pattern, and one or more demodulation reference signals (DMRSs);
   receiving, within a second frequency range and during a second time period, a plurality of multiplexed sidelink positioning reference signals from the one or more sidelink UEs in accordance with the sidelink positioning reference signal burst patterns; and
   determining a position of the UE based at least in part on the receiving of the plurality of multiplexed sidelink positioning reference signals.

2. The method of claim 1, wherein receiving the plurality of sidelink control blocks further comprises:
   receiving the plurality of sidelink control blocks during a first subset of symbols of a slot, wherein the first time periods are each within the first subset of symbols of the slot and wherein the second time period is a second subset of symbols of the slot subsequent to the first subset of symbols of the slot.

3. The method of claim 1, wherein receiving the plurality of sidelink control blocks further comprises:
   receiving the plurality of sidelink control blocks in different first slots, wherein the first time periods are within the different first slots and wherein the second time period is a second slot subsequent to the different first slots.

4. The method of claim 1, wherein receiving the plurality of sidelink control blocks further comprises:

receiving at least one of the plurality of sidelink control blocks in a frequency range of the first frequency ranges that overlaps in frequency with the second frequency range.

5. The method of claim 1, wherein receiving the plurality of sidelink control blocks further comprises:
receiving at least one of the plurality of sidelink control blocks in a frequency range of the first frequency ranges that does not overlap in frequency with the second frequency range.

6. The method of claim 1, further comprising:
receiving the plurality of multiplexed sidelink positioning reference signals from the one or more sidelink UEs multiplexed on different tones within the second frequency range and during the second time period in accordance with the sidelink positioning reference signal burst patterns.

7. The method of claim 1, further comprising:
determining, based at least in part on the plurality of sidelink control blocks, that the plurality of multiplexed sidelink positioning reference signals are received in a plurality of symbols of a slot; and
performing a gain control function using the plurality of multiplexed sidelink positioning reference signals during a first symbol of the plurality of symbols.

8. The method of claim 1, further comprising:
identifying, based at least in part on the plurality of sidelink control blocks, a gain control symbol associated with the plurality of multiplexed sidelink positioning reference signals; and
performing a gain control function using the plurality of multiplexed sidelink positioning reference signals during the gain control symbol.

9. The method of claim 1, further comprising:
identifying a gain control offset between the plurality of sidelink control blocks and the plurality of multiplexed sidelink positioning reference signals; and
performing a gain control function using the plurality of multiplexed sidelink positioning reference signals based at least in part on the gain control offset.

10. The method of claim 9, further comprising:
identifying the gain control offset based at least in part on the plurality of sidelink control blocks, on one or more radio resource control messages, or both.

11. The method of claim 1, further comprising:
performing a gain control function using the plurality of sidelink control blocks; and
determining a gain control associated with the plurality of multiplexed sidelink positioning reference signals based at least in part on the gain control function.

12. The method of claim 1, wherein a first gain control symbol associated with the plurality of sidelink control blocks is within a threshold power level of the plurality of multiplexed sidelink positioning reference signals.

13. The method of claim 1, wherein each sidelink control block indicates a frequency domain resource allocation and a time domain resource allocation of the plurality of multiplexed sidelink positioning reference signals for one of the one or more sidelink UEs.

14. The method of claim 1, wherein the second frequency range is a larger bandwidth than individual ones of the first frequency ranges.

15. An apparatus for wireless communication at a user equipment (UE), comprising:
one or more transceivers;
one or more memory; and
one or more processors electronically coupled to the one or more memory and the one or more transceivers, the one or more processors configured to:
receive, via first frequency ranges and first time periods, a plurality of sidelink control blocks that each indicate a sidelink positioning reference signal burst pattern for one or more sidelink UEs, wherein each of the plurality of sidelink control blocks comprises a physical sidelink control channel (PSCCH) sidelink control information-1 (SCI-1), a physical sidelink shared channel (PSSCH) sidelink control information-2 (SCI-2) that indicates the sidelink positioning reference signal burst pattern, and one or more demodulation reference signals (DMRSs);
receive, within a second frequency range and during a second time period, a plurality of multiplexed sidelink positioning reference signals from the one or more sidelink UEs in accordance with the sidelink positioning reference signal burst patterns; and
determine a position of the UE based at least in part on the receiving of the plurality of multiplexed sidelink positioning reference signals.

16. The apparatus of claim 15, wherein, to receive the plurality of sidelink control blocks, the one or more processors are configured to:
receive the plurality of sidelink control blocks during a first subset of symbols of a slot, wherein the first time periods are each within the first subset of symbols of the slot and wherein the second time period is a second subset of symbols of the slot subsequent to the first subset of symbols of the slot.

17. The apparatus of claim 15, wherein, to receive the plurality of sidelink control blocks, the one or more processors are configured to:
receive the plurality of sidelink control blocks in different first slots, wherein the first time periods are within the different first slots and wherein the second time period is a second slot subsequent to the different first slots.

18. The apparatus of claim 15, wherein, to receive the plurality of sidelink control blocks, the one or more processors are configured to:
receive at least one of the plurality of sidelink control blocks in a frequency range of the first frequency ranges that overlaps in frequency with the second frequency range.

19. The apparatus of claim 15, wherein, to receive the plurality of sidelink control blocks, the one or more processors are configured:
receive at least one of the plurality of sidelink control blocks in a frequency range of the first frequency ranges that does not overlap in frequency with the second frequency range.

20. The apparatus of claim 15, wherein the one or more processors are configured to:
receive the plurality of multiplexed sidelink positioning reference signals from the one or more sidelink UEs multiplexed on different tones within the second frequency range and during the second time period in accordance with the sidelink positioning reference signal burst patterns.

21. The apparatus of claim 15, wherein the one or more processors are configured to:
determine, based at least in part on the plurality of sidelink control blocks, that the plurality of multiplexed sidelink positioning reference signals are received in a plurality of symbols of a slot; and perform a gain control function using the plurality of multiplexed sidelink positioning reference signals during a first symbol of the plurality of symbols.

22. The apparatus of claim 15, wherein the one or more processors are configured to:
identify, based at least in part on the plurality of sidelink control blocks, a gain control symbol associated with the plurality of multiplexed sidelink positioning reference signals; and
perform a gain control function using the plurality of multiplexed sidelink positioning reference signals during the gain control symbol.

23. The apparatus of claim 15, wherein the one or more processors are configured to:
identify a gain control offset between the plurality of sidelink control blocks and the plurality of multiplexed sidelink positioning reference signals; and
perform a gain control function using the plurality of multiplexed sidelink positioning reference signals based at least in part on the gain control offset.

24. The apparatus of claim 23, wherein the one or more processors are configured to:
identify the gain control offset based at least in part on the plurality of sidelink control blocks, on one or more radio resource control messages, or both.

25. The apparatus of claim 15, wherein the one or more processors are configured to:
perform a gain control function using the plurality of sidelink control blocks; and
determine a gain control associated with the plurality of multiplexed sidelink positioning reference signals based at least in part on the gain control function.

26. The apparatus of claim 15, wherein a first gain control symbol associated with the plurality of sidelink control blocks is within a threshold power level of the plurality of multiplexed sidelink positioning reference signals.

27. The apparatus of claim 15, wherein the second frequency range is a larger bandwidth than individual ones of the first frequency ranges.

28. An apparatus for wireless communication at a user equipment (UE), comprising:
means for receiving, via first frequency ranges and first time periods, a plurality of sidelink control blocks that each indicate a sidelink positioning reference signal burst pattern for one or more sidelink UEs, wherein each of the plurality of sidelink control blocks comprises a physical sidelink control channel (PSCCH) sidelink control information-1 (SCI-1), a physical sidelink shared channel (PSSCH) sidelink control information-2 (SCI-2) that indicates the sidelink positioning reference signal burst pattern, and one or more demodulation reference signals (DMRSs);
means for receiving, within a second frequency range and during a second time period, a plurality of multiplexed sidelink positioning reference signals from the one or more sidelink UEs in accordance with the sidelink positioning reference signal burst patterns; and
means for determining a position of the UE based at least in part on the receiving of the plurality of multiplexed sidelink positioning reference signals.

29. A non-transitory computer-readable medium storing code for wireless communication at a user equipment (UE), the code comprising instructions executable by a processor to:
receive, via first frequency ranges and first time periods, a plurality of sidelink control blocks that each indicate a sidelink positioning reference signal burst pattern for one or more sidelink UEs, wherein each of the plurality of sidelink control blocks comprises a physical sidelink control channel (PSCCH) sidelink control information-1 (SCI-1), a physical sidelink shared channel (PSSCH) sidelink control information-2 (SCI-2) that indicates the sidelink positioning reference signal burst pattern, and one or more demodulation reference signals (DMRSs);
receive, within a second frequency range and during a second time period, a plurality of multiplexed sidelink positioning reference signals from the one or more sidelink UEs in accordance with the sidelink positioning reference signal burst patterns; and
determine a position of the UE based at least in part on the receiving of the plurality of multiplexed sidelink positioning reference signals.

* * * * *